United States Patent
Uno

(10) Patent No.: US 8,051,221 B2
(45) Date of Patent: Nov. 1, 2011

(54) COMMUNICATION SYSTEM, INFORMATION PROCESSING DEVICE, PERIPHERAL DEVICE AND COMMUNICATION METHOD

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 758 days.

(21) Appl. No.: 11/533,078

(22) Filed: Sep. 19, 2006

(65) Prior Publication Data

US 2007/0094424 A1 Apr. 26, 2007

(30) Foreign Application Priority Data

Sep. 20, 2005 (JP) ................. 2005-272379

(51) Int. Cl.
 *G06F 3/00* (2006.01)
 *G06F 13/12* (2006.01)
 *G06F 13/38* (2006.01)
(52) U.S. Cl. ............. 710/20; 710/7; 710/21; 710/62
(58) Field of Classification Search ........... 710/8, 62, 710/74, 20, 7, 21; 711/163
 See application file for complete search history.

(56) References Cited

U.S. PATENT DOCUMENTS

| 5,892,955 | A | 4/1999 | Ofer | |
|---|---|---|---|---|
| 6,697,866 | B1* | 2/2004 | Arakawa et al. | 709/229 |
| 7,257,573 | B2* | 8/2007 | Matsumoto | 1/1 |
| 2002/0162010 | A1* | 10/2002 | Allen et al. | 713/200 |
| 2002/0178304 | A1 | 11/2002 | Camara et al. | |
| 2002/0191079 | A1 | 12/2002 | Kobayashi et al. | |
| 2004/0064596 | A1* | 4/2004 | Erickson et al. | 710/5 |
| 2004/0136224 | A1 | 7/2004 | Hamer et al. | |
| 2005/0023339 | A1 | 2/2005 | Uno | |
| 2005/0033888 | A1* | 2/2005 | Qi | 710/200 |
| 2005/0141056 | A1 | 6/2005 | Nobe et al. | |
| 2005/0289260 | A1 | 12/2005 | Hamer et al. | |
| 2006/0095625 | A1* | 5/2006 | Wootten et al. | 710/300 |
| 2006/0271608 | A1* | 11/2006 | Qi et al. | 707/205 |

FOREIGN PATENT DOCUMENTS

| JP | H05-216592 A | 8/1993 |
|---|---|---|
| JP | H11-085412 A | 3/1999 |
| JP | 2000-227868 A | 8/2000 |
| JP | 2002-049534 A | 2/2002 |
| JP | 2002-077690 A | 3/2002 |

(Continued)

OTHER PUBLICATIONS

European Patent Office, European Search Report for Related EP Application No. 06024877, dated Mar. 20, 2007.

(Continued)

*Primary Examiner* — Alford Kindred
*Assistant Examiner* — Farley Abad
(74) *Attorney, Agent, or Firm* — Baker Botts L.L.P.

(57) ABSTRACT

A communication system that performs data communications based on an SCSI command defined in the SCSI standard, the communication system includes; a peripheral device that performs at least one of writing and reading to/from a recording medium inserted into a slot; and an information processing device connected to the peripheral device, including: an OS kernel; an adding unit that adds communication data to a free area of Inquiry data generated by issuing Inquiry command to the OS kernel; and a transmitting unit that transmits the Inquiry data to the peripheral device including the communication data added by the adding unit, wherein the peripheral device includes: a receiving unit that receives the Inquiry data transmitted by the transmitting unit; and an extracting unit that extracts the communication data added to the received Inquiry data.

15 Claims, 13 Drawing Sheets

FOREIGN PATENT DOCUMENTS

| | | |
|---|---|---|
| JP | 2002-109528 A | 4/2002 |
| JP | 2002-222158 A | 8/2002 |
| JP | 2002-320117 A | 10/2002 |
| JP | 2004-215164 A | 7/2004 |
| JP | 2005018645 A | 1/2005 |
| JP | 2005-050192 A | 2/2005 |
| JP | 2005080129 A | 3/2005 |
| JP | 2005107875 A | 4/2005 |
| JP | 2005-538455 T | 12/2005 |

OTHER PUBLICATIONS

International Commitee on Information Technology Standards, SCSI Primary Commands—(SPC-3), T10/1416-D Revision 23, Para. 6.4—"Inquiry Command," May 4, 2005.

Japan Patent Office; Notification of Reason for Refusal in Japanese Patent Application No. 2005-272379 mailed Jan. 5, 2010.

Japan Patent Office; Notice of Reason for Refusal in Japanese Patent Application No. 2006-092560 mailed Feb. 18, 2010.

Japan Patent Office; Notification of Reason for Refusal in Japanese Patent Application No. 2005-272379 mailed Jan. 5, 2010. (Submitted as concise explanation of relevance of the Suzuki Article.).

Hiroshi Suzuki; "Principle of SCSI and Utilization Technique SCSI Utilization Study in MS-DOS & Unix"; Interface CQ Publishing Co., Ltd., Jan. 1, 1993, vol. 19 No. 1 pp. 88-119. Cited in the enclosed Notification of Reason for Refusal of Japanese Patent Application No. 2005-272379.

* cited by examiner

COMMUNICATION SYSTEM, INFORMATION PROCESSING DEVICE, PERIPHERAL DEVICE AND COMMUNICATION METHOD

CROSS-REFERENCE TO THE RELATED APPLICATION(S)

This application is based upon and claims priority from prior Japanese Patent Application No. 2005-272379 filed on Sep. 20, 2005, the entire contents of which are incorporated herein by reference.

TECHNICAL FIELD

The present invention relates to a communication system that performs data communications based on an SCSI (Small Computer System Interface) command between a peripheral device equipped with a slot for inserting a recording medium such as a memory card and an information processing device such as a personal computer (hereinafter referred to as the PC) to which the peripheral device is connected.

BACKGROUND

In recent years, a so-called memory card (an example of recording medium) is widely known where a nonvolatile memory such as a flash memory is packaged into a card shape. The memory card has been rapidly spreading as a data storage medium used for digital devices such as a digital camera and a portable music player. There are no unified specifications for memory cards. Various types of memory cards are on the marketplace such as a compact flash (registered trademark, hereinafter referred to as the "CF"), smart media (registered trademark, hereinafter referred to as the "SM"), a memory stick (registered trademark, hereinafter referred to as the "MS"), and an SD memory card (registered trademark, hereinafter referred to as the "SD").

An access from such a memory may be available to a PC by using a memory card reader/writer (one example of peripheral device, hereinafter abbreviated as the "reader/writer) used to read/write from/to a memory card while connected to a PC. This allows data communications between a PC and a memory card. Such a reader/writer may be a single slot type equipped with a slot for inserting a memory card and multi-spot type including multiple slots to allow data read/write from/to more than one memory card, as disclosed in JP-A-2005-18645 and JP-A-2005-107875.

To read/write data stored in a memory card from/to a PC by using a reader/writer, it is necessary to recognize a reader/writer and install driver software to allow access to an inserted memory card. In recent years, an operating system (hereinafter abbreviated as the OS) for a PC comes preinstalled with driver software to support various types of reader/writer and memory cards. On the other hand, a PC including an OS such as a Windows98 and Windows2000 (Windows is a registered trademark) as earlier version of windows (hereinafter referred to as a lower-rank OS) than the multi-slot type developed after the single-slot type does not have dedicated driver software supporting the multi-slot type. The user thus needs to install dedicated compatible driver software as in the related art practice. In case a multi-slot type reader/writer (hereinafter referred to the multi-reader/writer) should be connected to a PC including a lower rank OS, access to only a predetermined slot is allowed.

Data communications between a PC and a reader/writer, that is, a communication protocol used for data communications between a PC and a memory card is often designed so that the data communications may be performed based on an SCSI command defined in the SCSI standard. The SCSI standard is a communication protocol established by the ANSI (American national Standard Institute) and enjoys global conformance. The SCSI command is a command term specified in the SCSI standard. Such a communication protocol is capable of enhancing the versatility of a PC and a reader/writer and is thus widely used. In the following description, the SCSI standard mainly refers to SCSI-2.

Data communications made based on an SCSI command between a PC 3 and a reader/writer 77 connected via USB ("Universal Serial Bus") to the PC 3 via a USB-I/F 78 will be described referring to FIG. 13. FIG. 13 is a conceptual drawing for explaining an OS 70 (Windows2000 in this example) running on the PC 3 and an application running on the OS 70. The OS 70 has a basic system including a GUI (Graphical User Interface) 71, a file system 72 and an OS kernel 73. The GUI 71 is a user interface that provides the user's input by way of computer graphics and a pointing device such as a mouse. The file system 72 includes a method of managing data by using files and folders in a computer and its management system. The OS kernel 73 is a software program that implements basic features such as one supervising applications and peripheral device. The PC 3 has driver software 74 preinstalled therein to allow an access to a reader/writer. The driver software 74 is implemented in modular form in the OS kernel 73.

As shown in the figure, assume that the Explorer 75 as an example of application used to access the reader/writer 77 and an R/W application 76 are activated on the PC 3. The Explorer 75 is created in conformity to the system of the OS 70 and generally recognized as a feature of the OS 70. Thus, the Explorer 75 communicates with the reader/writer 77 via the file system 72. On the other hand, the R/W application 76 is a unique software application developed by the manufacturer of the reader/writer 77 and performs processing to write or read data to/from a recording medium inserted into the reader/writer 77. In general, the R/W application 76 is created without conformity to the OS 70 because the specifications of the file system 72 are not made public.

First, an access to the reader/writer 77 from the Explorer 75 will be described. Once the OS 70 is activated and the Explorer 75 is accordingly activated, the Inquiry command (one example of SCSI command) is issued to the OS kernel 73 via the file system 72 by the Explorer 75. Note that all SCSI commands including the Inquiry command are designed to be issued to an SCSI command processing entry 79 virtually provided to the OS kernel 73. When the Inquiry command is issued, configuration information such as the type and device name of the reader/writer 77, SCSI-ID, presence/absence of LUN and type of memory card are returned from the reader/writer 77. This allows the reader/writer 77 to be recognized. When the reader/writer 77 is recognized, a drive icon of the reader/writer 77 is created on the Explorer 75 by the GUI 71. When the user accesses the drive icon by using a mouse to enter a data read instruction, the Explorer 75 engages the file system 72 to issue the Read command (one example of SCSI command). On the other hand, when the user enters a write instruction, the Explorer 75 engages the file system 72 to issue the Write command (one example of SCSI command) These command data are transferred to the reader/writer 77 via an I/F such as the USB, followed by data read/write operation on the reader/writer 77 in accordance with the command. The Inquiry command is issued also when the poser of the PC 3 is reset with the reader/writer 77 connected.

Next, an access to the reader/writer 77 from the R/W application 76 will be described. Once the R/W application 76 is activated, a request to open a data bus to the R/WW application alone is issued to the OS kernel 73. Receiving this request, the OS kernel 73 causes the R/W application 76 to occupy the data bus. In other words, the SCSI command issued to the SCSI command processing entry 79 is not accepted at the SCSI command processing entry 79. Thus, while the R/W application 76 is being activated, the file system 72 cannot access the reader/writer 77. When the R/W application 76 is activated, an input screen (user interface screen) programmed by the R/W application 76 is presented on the display via the GUI 71. The Inquiry command is issued to the OS kernel 73 by the driver software 74 to acquire configuration information such as the type and device name of the reader/writer 77. This allows the reader/writer 77 to be recognized. After that, data read/write operation is made on the reader/writer 77 in accordance with the Read command or Write command issued to the OS kernel 73 by the driver software 74.

Recognition of the reader/writer 77 is made as follows. First, the Inquiry data generated when the Inquiry command is issued to the OS kernel 73 is transmitted to the reader/writer 77. Receiving the Inquiry data, the reader/writer 77 references various information included in the Inquiry data to generate configuration information in accordance with the information, and transmits Standard-Inquiry data including the configuration information to the PC. Based on the returned Standard-Inquiry data, the reader/writer 77 is recognized.

SUMMARY

As described above, when the R/W application 76 is activated, the data bus is occupied by the R/W application 76, which makes unavailable the communications with the reader/writer 77 by the Explorer 75 via the file system 72. On this occasion, when the memory card inserted into the reader/writer 77 is replaced with another, the information to indicate the replacement is stored into the internal memory of the reader/writer 77. In reality, a predetermined bit flag is turned on (that is, a predetermined bit is changed from "0" to "1"). When the bit flag is on, an SCSI command such as the Read command and Write command issued from the R/W application 76 is not accepted but is forced to fail. As an exception, a special command such as the Inquiry command is not rejected but accepted.

When the SCSI command is forced to fail, the Inquiry command is issued from the R/W application 76 and information on the new memory card is acquired anew. Accepting the Inquiry command, the reader/writer 77 acquires the memory card information by way of the R/W application 76, which turns off the bit flag (the predetermined bit is changed from "1" to "0"). This allows an access from the R/W application 76 to the reader/writer 77 without inviting a crash of the memory card.

When the R/W application 76 is terminated after the bit flag is turned off, the data bus is no longer occupied by the R/W application 76. That is, an SCSI command issued by the Explorer 75 via the file system 72 is accepted at the SCSI command processing entry 79. This allows an access to the reader/writer 77 by the Explorer 75. The explorer 75 and the file system 72 have not acquired information on the new memory card. When the Read command or Write command is issued by the Explorer 75 and is accepted by the reader/writer 77, the Explorer 75 accesses the new memory card based on the information on the previous memory card (such as type, data structure and data volume of memory card). On that occasion, data in the memory card could be destroyed or the memory card could be crashed. In the related art, a cumbersome procedure has been used to solve the problem such as forcibly resetting the reader/writer 77 to acquire the configuration information of the reader/writer or ejecting the memory card.

The data communications are performed with a memory card inserted into the slot of the reader/writer 77. Thus, the data communications provide data transmission/reception between the PC 3 and the memory card. However, in the data communications, transmission/reception of desired data to/from an accessory device to the reader/writer 77 except a memory card, such as a liquid crystal display or a switch on the reader/writer 77 is unavailable within the scope of the related art OS specifications.

Thus, there has been a strong need for a communication technique whereby data communications from the R/W application 76 to the reader/writer 77 are made available with the bit flag on while the R/W application 76 is running, and a communication technique whereby data communications with an accessory device other than a storage such as a memory card recognized as a drive.

The invention has been accomplished in view of the above circumstances. An object of the invention is to provide a communication system capable of performing data communications between a peripheral device and an information processing device within the scope of the SCSI standard while maintaining the condition where an SCSI command issued to a peripheral device such as a reader/writer is rejected by the peripheral device in principle.

According to an aspect of the invention, there is provided a communication system that performs data communications based on an SCSI command defined in the SCSI standard, the communication system including: a peripheral device that performs at least one of writing and reading to/from a recording medium inserted into a slot; and an information processing device connected to the peripheral device, including: an OS kernel; an adding unit that adds communication data to a free area of Inquiry data generated by issuing Inquiry command to the OS kernel; and a transmitting unit that transmits the Inquiry data to the peripheral device including the communication data added by the adding unit, wherein the peripheral device includes: a receiving unit that receives the Inquiry data transmitted by the transmitting unit; and an extracting unit that extracts the communication data added to the received Inquiry data.

In the communication system performing data communications based on an SCSI command, in case the power source is reset while a peripheral device is connected to an information processing device or while an information processing device and a peripheral device are interconnected, the information processing device issues the Inquiry command to the OS kernel and transmits Inquiry data to the peripheral device to obtain the configuration information of the peripheral device (such as the type, device name, SCSI-ID and LUD of device). Receiving the Inquiry data, the peripheral device references various information included in the Inquiry data and returns Standard-Inquiry including configuration information in accordance with the information.

A free area is previously reserved in the Inquiry data. Arbitrary communication data is added to the free area and the resulting Inquiry data is transmitted to the peripheral device. The peripheral device extracts the communication data added to the received Inquiry data. This transfers data from an information processing device to a peripheral device.

According to another aspect of the invention, there is provided an information processing device, including; an OS kernel; an adding unit that adds communication data to a free area of Inquiry data generated by issuing Inquiry command to the OS kernel; and a transmitting unit that transmits the Inquiry data to the peripheral device including the communication data added by the adding unit, wherein the information processing device is connectable to a peripheral device that performs at least one of writing and reading to/from a recording medium inserted into a slot, and the information processing device performs data communications with the peripheral device based on an SCSI command defined in the SCSI standard.

According to another aspect of the invention, there is provided a peripheral device that including: a receiving unit that receives Inquiry data, which includes communication data added to a free area and is transmitted by an information processing device; and an extracting unit that extracts the communication data added to the received Inquiry data, wherein the peripheral device is connectable to the information processing device, performs at least one of writing and reading to/from a recording medium inserted into a slot and performs data communications with the information processing device based on an SCSI command defined in the SCSI standard.

According to another aspect of the invention, there is provided a communication method that performs data communications based on an SCSI command defined in the SCSI standard between a peripheral device that performs at least one of writing and reading to/from a recording medium inserted into a slot and an information processing device connected to the peripheral device, the communication method including: adding communication data to a free area of Inquiry data generated by issuing Inquiry command to an OS kernel of the information processing device; transmitting the Inquiry data to the peripheral device including the communication data; receiving the transmitted Inquiry data; and extracting the communication data added to the received Inquiry data.

According to the communication system that performs data communications based on an SCSI command, a free area is previously reserved in Inquiry data. Arbitrary communication data is added to the free area and the resulting Inquiry data is transmitted from an information processing device to a peripheral device, which extracts the communication data added to the received Inquiry data. This allows data communications between an information processing device and a peripheral device while an SCSI command except the Inquiry command is rejected by the peripheral device in principle, or in other words, with a flag indicating replacement of a recording medium is kept on. Data communications to a peripheral device is allowed from an application without driver software such as a special kernel driver being installed.

BRIEF DESCRIPTION OF THE DRAWINGS

These and other objects and advantages of the present invention will be more fully apparent from the following detailed description taken in conjunction with the accompanying drawings, in which.

DETAILED DESCRIPTION OF THE ILLUSTRATIVE ASPECTS

Figure 1A:
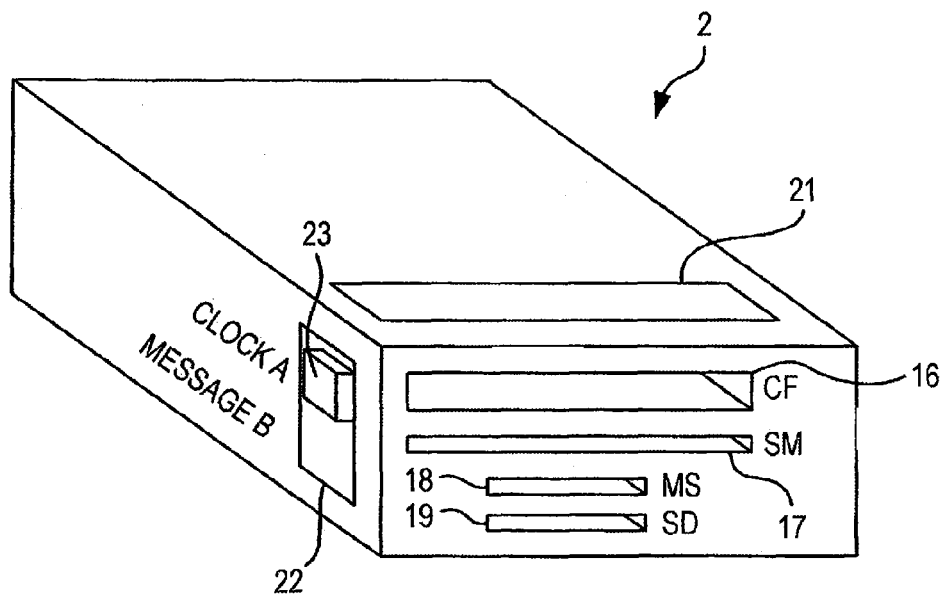
FIGS. 1A and 1B are schematic views of a multi-reader/writer (an example of peripheral device) applied to a communication system.
Figure 1B:
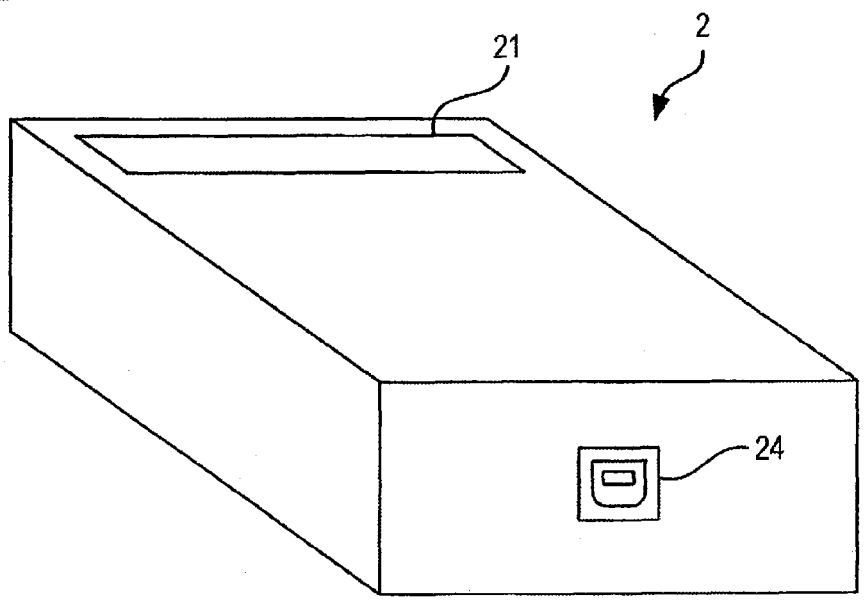
Figure 2:
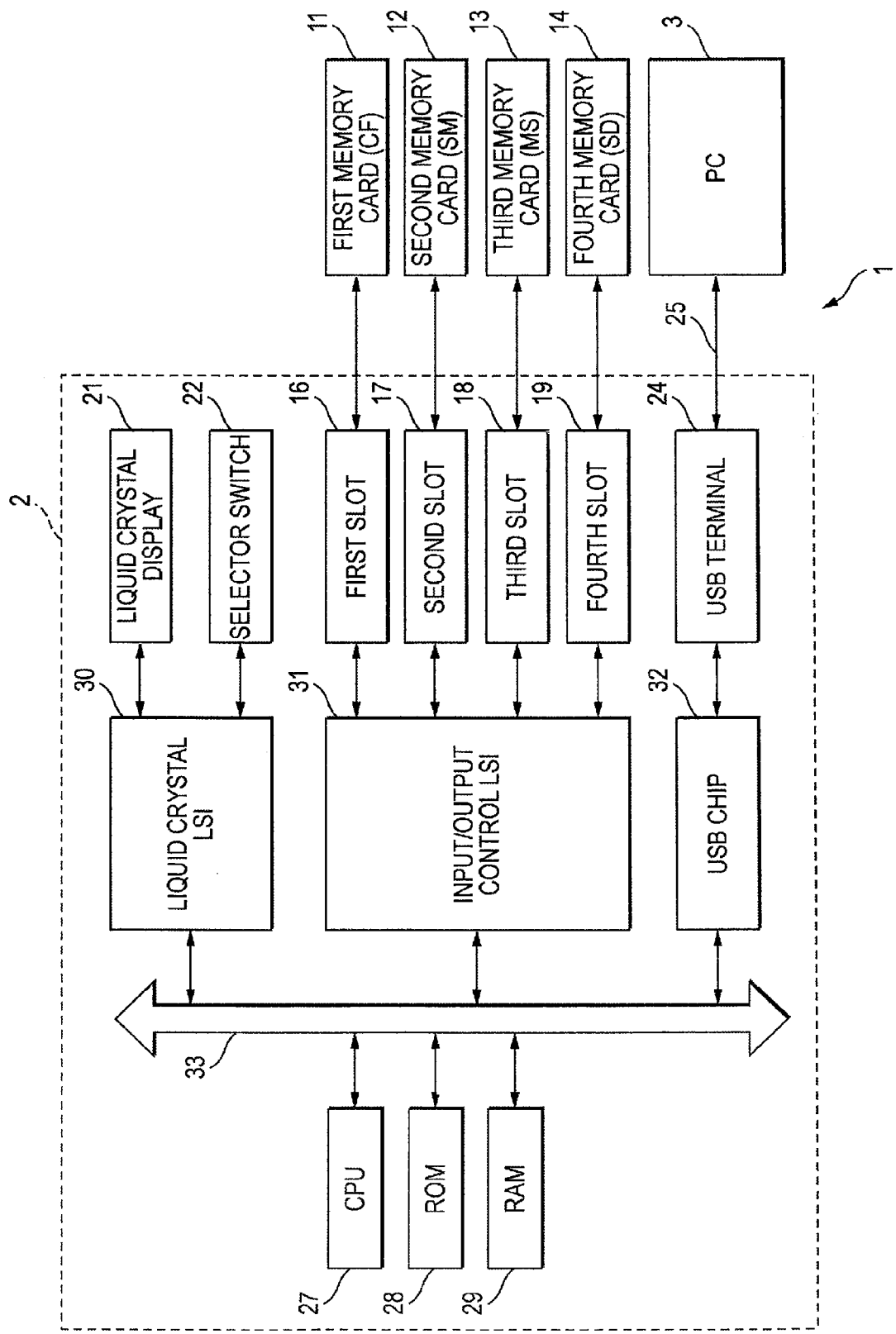
FIG. 2 is a block diagram showing the general configuration of the multi-reader/writer.
Figure 3:
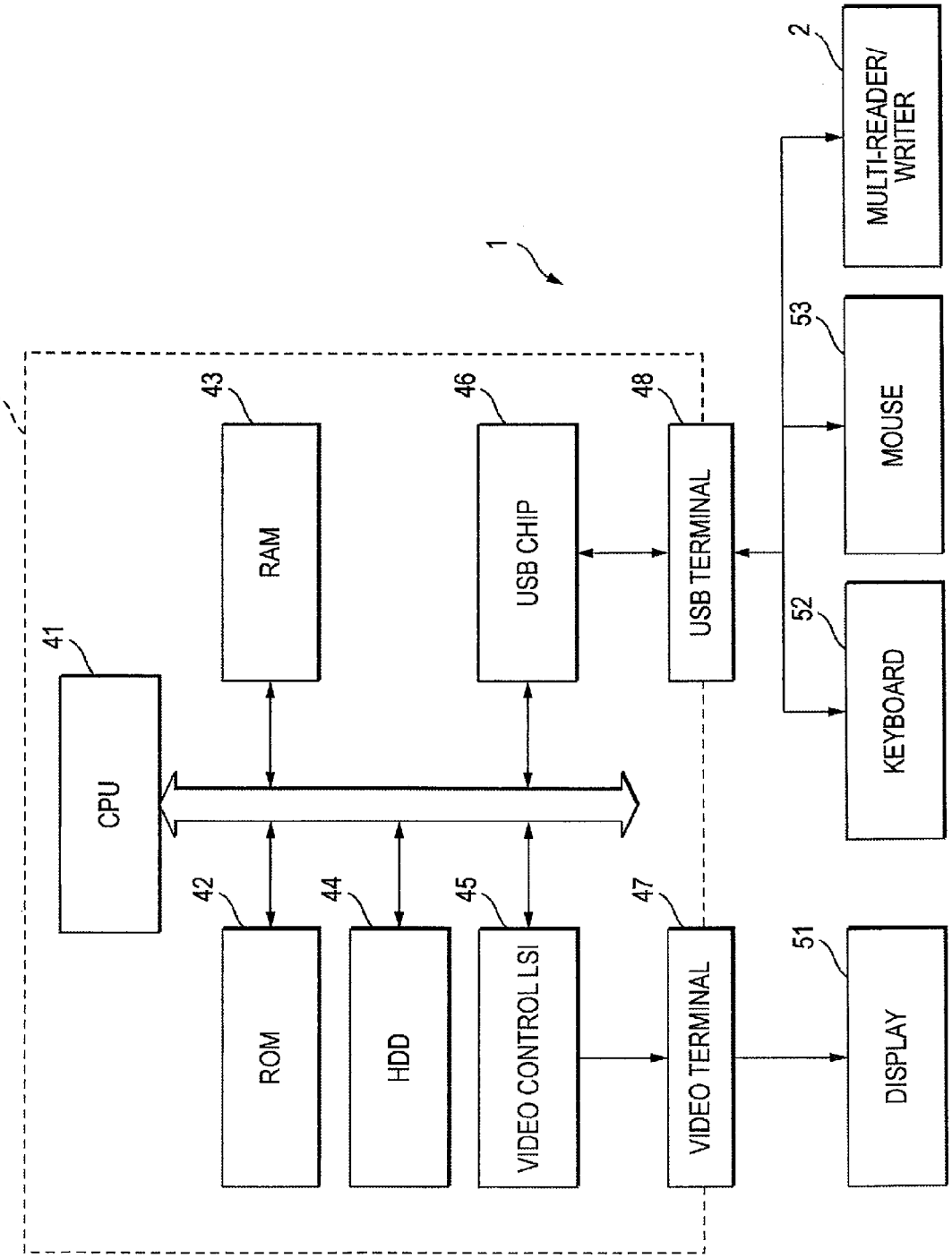
FIG. 3 is a block diagram showing the general configuration of a PC applied to the communication system.

A communication system 1 according to the first embodiment of the invention will be described referring to drawings as required. FIGS. 1A and 1B are perspective views of a multi-reader/writer 2 (an example of peripheral device) applied to the communication system 1. FIG. 2 is a block diagram showing the general configuration of the multi-reader/writer 2. FIG. 3 is a block diagram showing the general configuration of a PC 3 (an example of information processing device) applied to the communication system 1. Configuration of the communication system 1 described below is only an example to embody the invention and may be modified as required without departing from the spirit and scope of the invention.

As shown in FIG. 1A, the multi-reader/writer 2 includes, on its front surface, a first slot 16 for inserting a first memory card 11 (for example a CF), a second slot 17 for inserting a second memory card 12 (for example an SM), a third slot 18 for inserting a first memory card 13 (for example an MS), and a fourth slot 19 for inserting a fourth memory card 14 (for example an SD). The first to fourth memory cards 11-14 are examples of recording media used in the invention. While the multi-reader/writer 2 is described as an exemplary peripheral device in this embodiment, the invention is also applicable to a single slot type reader/writer. In case a magnetic disc medium such as a CD-ROM or DVD-ROM is used as a recording medium instead of a CF or SM, a so-called changer CD-ROM drive or changer DVD-ROM drive including an inserting part that accommodates one or more of such magnetic disc media serves as a peripheral device. The invention is applicable to a communication system including the peripheral device.

On the top surface of the multi-reader/writer 2 is arranged a liquid crystal display 21 for displaying predetermined information. The liquid crystal display 21 is used to display text information stored in the multi-reader/writer 2. An LED display may be used instead of the liquid crystal display 21. In this embodiment, display output of text information on the liquid crystal display 21 is made in accordance with an instruction from the PC 3.

On the side surface of the multi-reader/writer 2 is arranged a selector switch 22 for switching the internal contact between Position A and Position B. The protrusion 23 of the selector switch 22 moves vertically to cause a conductive part inside the protrusion 23 to come into contact with the A contact or the B contact thus switching the contact. The selector switch 22 is used to switch the content on the liquid crystal display 21. In this embodiment, when the protrusion 23 is switched to Position A, the display content on the liquid crystal display 21 is switched to the current time. When the protrusion 23 is in Position B, the content on the liquid crystal display 21 is switched to a predetermined message. The display content on the liquid crystal display 21 and its switching method may be changed as required. In this embodiment, detection of which contact, A or B, the selector switch is positioned is made in accordance with an instruction from the PC 3.

On the rear surface of the multi-reader/writer 2 is provided, as shown in FIG. 1B and FIG. 2, a USB terminal 24 for connecting a USB cable 25 (refer to FIG. 2). The USB terminal 24 and the USB cable 25 are used to enable data communications that are based on an SCSI command between the PC 3 and the multi-reader/writer 2, and conform to the SCSI standard. Thus, it is possible to apply an IEEE1394 connector instead of the USB terminal 24. While SCSI-2 is used as an SCSI standard in this embodiment, the invention is also applicable to a revised standard called SCSI-I or SCSI=3.

As shown in FIG. 2, the multi-reader/writer 2 includes therein a CPU 27 for controlling component parts, a ROM 28 for storing a control program and various data, a RAM 29 that temporarily stores digital data concerning predetermined information displayed on a liquid crystal display 21 or serves as a works area for arithmetic operation by the CPU 27, a liquid crystal LSI 30, an input/output control LSI 31, and a USB chip 32. These components are interconnected via a bus 33 to allow data communications therebetween. The liquid crystal LSI 30 is a driver that drives a liquid crystal so that the display content of the liquid crystal display 21 will be predetermined information. The multi-reader/writer 2 is used to perform data communications with the PC 3 to which it is connected. Thus, a control program stored in the ROM 28 is created based on a communication protocol designed by the SCSI standard. A receiving unit, an extracting unit and a returning unit of the invention are embodied by the CPU 27 that performs predetermined processing in accordance with the control program. While this embodiment is an example where the information displayed on the liquid crystal display 21 is stored in the RAM 29, a semiconductor memory such as a RAM may be provided for liquid crystal display.

Predetermined information presented on the liquid crystal display 21 is character string information indicating message information or time information. The character string information is information including a series of characters, numerals or symbols. The RAM 29 has a storage area reserved therein for storing the character string information. The storage area is managed while divided into multiple character string storage areas each composed of 128 bytes. To each character string storage area is allocated an identification number for identifying the character string storage areas (hereinafter referred to as the "character string number").

The input/output control LSI 31 is used to control data input/output to the first to fourth memory cards 11 to 14 respectively inserted into the first to fourth slots 16 to 19. The USE chip 32 is a controller for controlling data transmission over the USB cable 25 based on the USB standard. The other end of the USB cable 25 connected to the PC 3 to allow data communications thereby implementing the communication system 1.

In the ROM 28 is stored in a table list form the analysis data used to analyze data coming from the PC 3. Tables 6 and 7 described later show the analysis data.

In the multi-reader/writer 2, when data is read/written from/to an inserted memory card, a memory area used to read data from the memory card or a memory area used to store data into the memory card is allocated. The data length of the allocated memory area is called an allocation length. In general, the allocation length is set to a data length specified by the PC 3 accessing the multi-reader/writer 2. In this invention, the maximum value of the allocation length that may be set with the multi-reader/writer 2 is set below the maximum numeric value that may be specified by the PC 3.

As shown in FIG. 3, the PC 3 includes a CPU 41 for controlling component parts, a ROM 42, a RAM 43, an HDD 44 storing various software program data, a video control LSI 45, a USB chip 46, a video terminal 47, and a USB terminal 48 including a plurality of input/output ports. These components are interconnected via a bus 49 to allow data transfer therebetween. They are integrated onto a main control board called a mother board. To the video terminal 51 is connected a display 51 via a video cable. The USB terminal 48 has a USB hub function. To the USB terminal 48 are a connected input unit such as a keyboard 52 and a mouse 53, as well as the multi-reader/writer 2. A receiving unit, an adding unit and a transmitting unit of the invention are embodied by the CPU 41 that performs predetermined processing in accordance with the software program.

The CPU has a clock function. The time measured by the clock function is digitized and stored in the RAM 42. The RAM 42 stores in digital form the messages input by the user via the keyboard 52. Such clock data and message data are transmitted to the multi-reader/writer 2 and displayed on the liquid crystal display 21.

The ROM 42 stores instruction data transmitted to the multi-reader/writer 2 that causes the CPU 27 of the multi-reader/writer 2 to execute predetermined processing. The instruction data is stored in the HDD 44 or ROM 42 in a table list form. Tables 6 and 7 described later correspond to the instruction data.

In the program storage are of the HDD 44 are stored the SP3 of Windows2000 (hereinafter referred to as OS 2000) as an operating system for the PC 3 and a software program such as an R/W application to enable data read/write from/to the multi-reader/writer 2. Such a software program is read by the CPU 41 and predetermined arithmetic operation is made thus allowing each application to operate on the PC 3. In the program storage area is stored a communication program conforming to a communication protocol specified by the SCSI standard so as to allow SCSI command-based data communication with the multi-reader/writer 2. While this embodiment describes the PC 3 where the OS 2000 is installed, an OS such as a Linux series or a Mac series may be installed in the PC 3. SP4 of Windows2000 may be used instead of SP3.

In the communication system 1, as described later using flowcharts (FIGS. 4 to 10), data communication displayed on the liquid crystal display 21 are made based on an SCSI command defined in the SCSI standard. Thus, the data communications provided by the communication system do not depart from the SCSI standard. In general, in data communications that are based on an SCSI command, data cannot be communicated in a state (hereinafter referred to as the Not Ready state) where the multi-reader/writer 2 rejects an SCSI command issued from the OS kernel of the PC 3, such as in case the data bus is occupied by another application or in case the driver software for the multi-reader/writer 2 is not installed. To solve the problem, the invention uses the Inquiry command that is exceptionally accepted by the multi-reader/writer 2 even in the Not Ready state to assure delivery of communication data between the PC 3 and the multi-reader/writer 2. As detailed later, a free area is previously reserved in Inquiry data (refer to Table 1) generated when the Inquiry command is issued and communication data is added to the free area. The Inquiry data with additional communication data is accepted by the multi-reader/writer 2 thus allowing transfer of communication data to the multi-reader/writer 2. Return data is written into VPD "Vital Product Data") (refer to Table 2) generated and returned by the multi-reader/writer 2 on receipt of Inquiry data. This allows transfer of return data to the PC 3.

TABLE 1

CDB-format Inquiry data

| Byte | Bit 7 | 6 | 5 | 4 | 3 | 2 | 1 | 0 |
|---|---|---|---|---|---|---|---|---|
| 0 | | | | 12h (operation code) | | | | |
| 1 | | LUN | | | Reserved | | | EVPD |
| 2 | | | | Page code | | | | |
| 3 | | | | Reserved | | | | |
| 4 | | | | Allocation length | | | | |
| 5 | | | | Control byte | | | | |

TABLE 2

VPD

| Byte | Bit 7 | 6 | 5 | 4 | 3 | 2 | 1 | 0 |
|---|---|---|---|---|---|---|---|---|
| 0 | | Qualifier | | | | Device type code | | |
| 1 | | | | Page code | | | | |
| 2 | | | | Reserved | | | | |
| 3 | | | | Page length (n − 3) | | | | |
| 4 ... n | | | | VPD information (specific to each page) | | | | |

An example of data communication procedure using Inquiry data in the communication system 1 will be described referring to flowcharts of FIGS. 4 to 10. In this embodiment, a series of procedures will be described where the clock data or message data stored in the RAM 43 of the PC 3 is transmitted to the multi-reader/writer 2 and either the clock data or message data is displayed on the liquid crystal display 21. Processing in each step is carried out as each component part is controlled by the CPU 41 of the PC 3 or CPU 27 of the multi-reader/writer 2. Signs S1, S2, . . . represent procedure (step) numbers.

Figure 4:
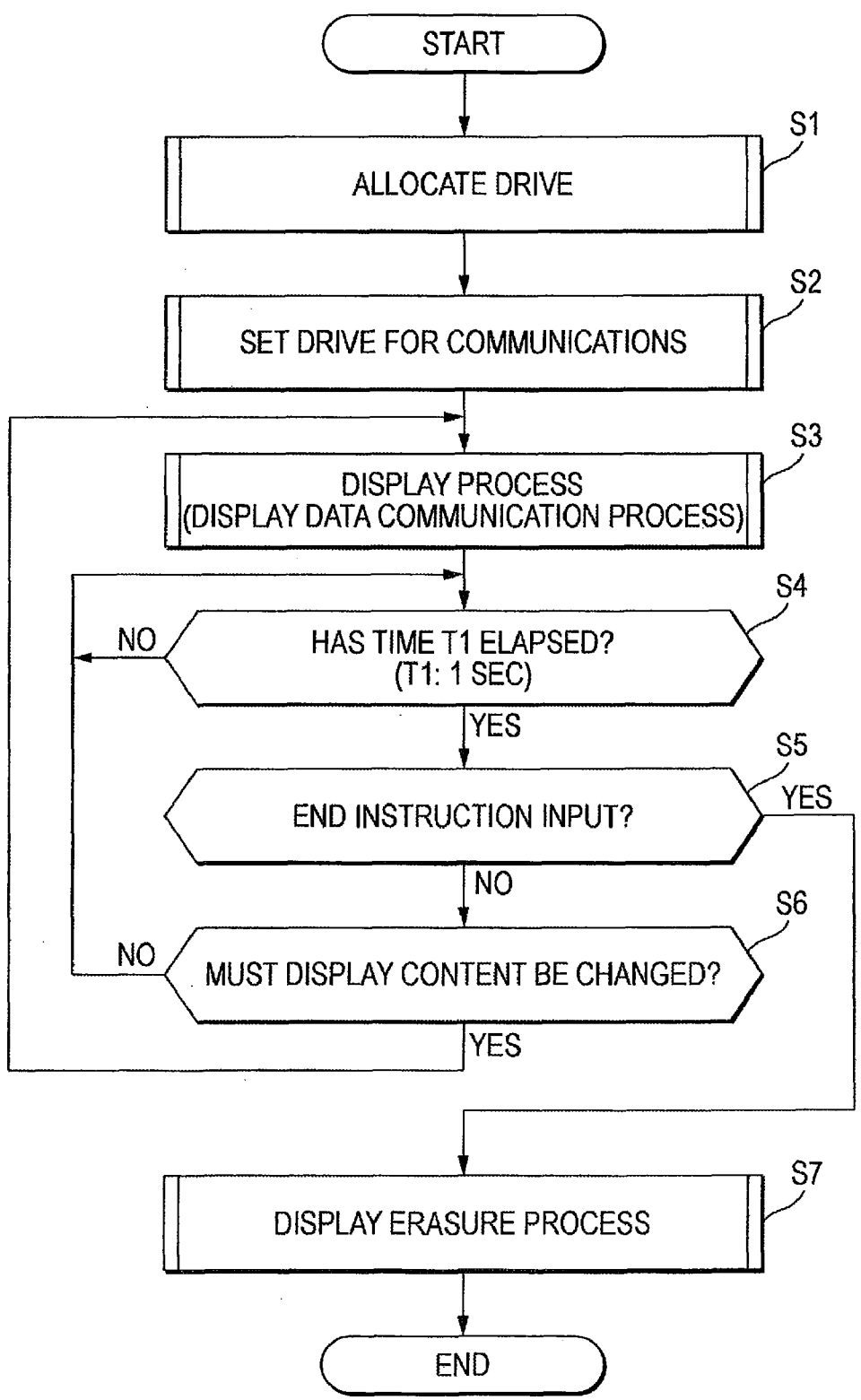
FIG. 4 is a flowchart illustrating the general procedure of a data communication process performed in the communication system.

FIG. 4 is a flowchart explaining the general procedure of data communications executed by the communication system 1. When power is supplied to each device with the multi-reader/writer 2 connected to the PC 3, a drive allocation process (S1) is executed whereby a drive is allocated to an unknown device connected to the PC 3. In this embodiment, a drive is allocated to the multi-reader/writer 2 that is the sole device connected to the PC 3.

Next, a drive setting process (S2) is performed where a drive selected by the user is set as a communication target. When the drive is set, a device (the multi-reader/writer 2 in this embodiment) corresponding to the set drive is recognized as a communication target. Then, communication data stored in the RAM 43 is transmitted to the multi-reader/writer 2 (transmission step), and communication data received by the multi-reader/writer 2 is transferred to the liquid crystal display 21 to display the data on the liquid crystal display to perform a transmission/display process (S3).

Whether the time T1 (for example one second) has elapsed since the transmission/display step is determined (S4) by a counting unit such as a timer that starts counting on completion of the transmission/display step. In case it is determined that the time T1 has elapsed in step S4 (Yes in step S4), it is determined whether a terminating instruction is input to terminate the system to the PC 3 (S5). In case it is determined that the terminating instruction is not input in step S5 (No in S5), determination is made on whether the display content must be changed (S6). In case it is determined that the display content must be changed (Yes in S3), the procedure from step 33 is repeated. In case it is determined that the display content need not be changed (No in S3), the procedure from step S4 is repeated.

In case it is determined that the terminating instruction is input in step S5 (Yes in S5), a display erasure process (S7) is performed to erase the information on the liquid crystal display 21, followed by completion of a series of processing. The drive allocation process (S1), the drive setting process (S2), the transmission/display process (s3), the process to determine whether the display content must be changed (S6), and the display erasure process (S7) will be respectively detailed.

Figure 5:
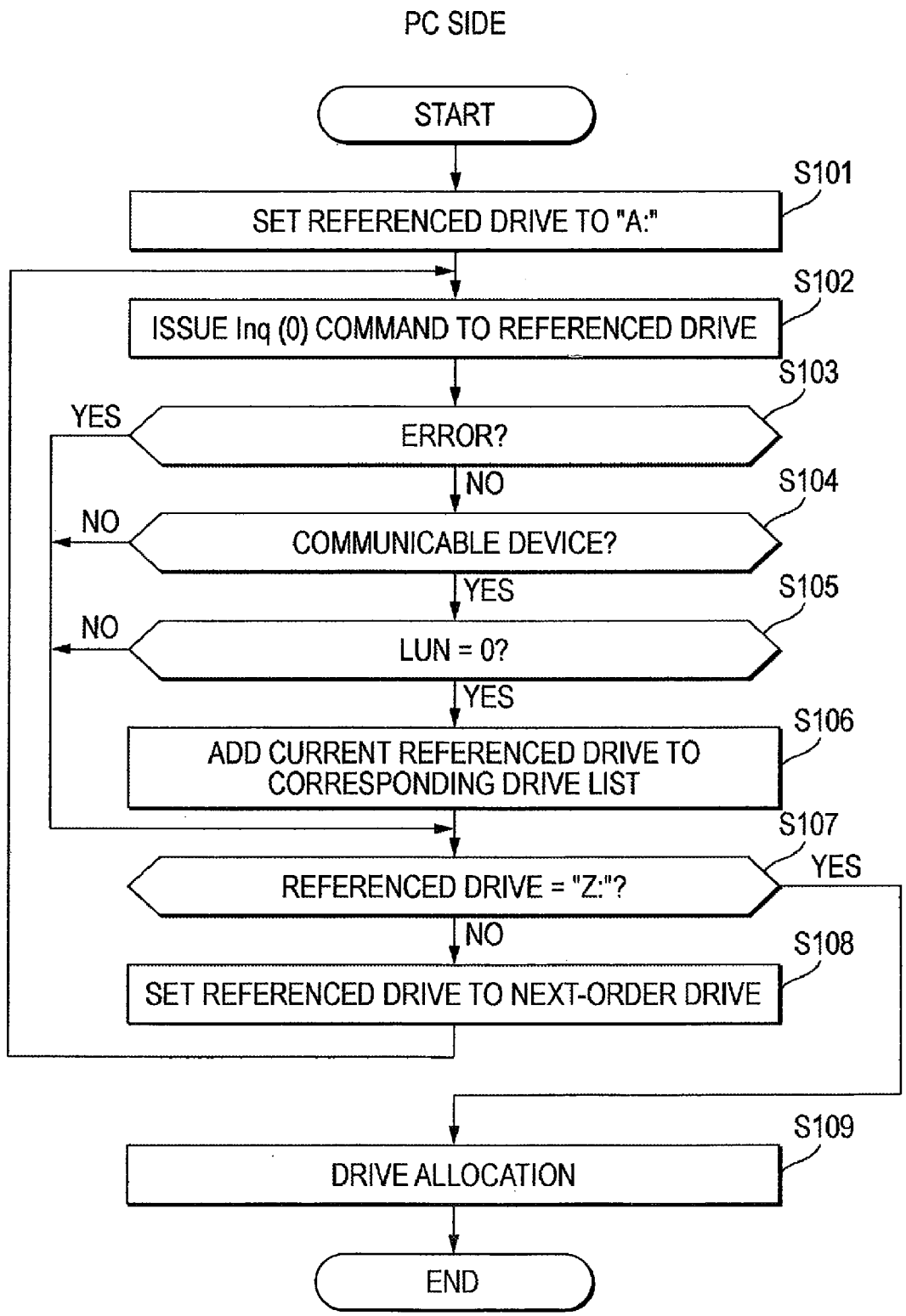
FIG. 5 is a flowchart illustrating the drive allocation process.
Figure 6:
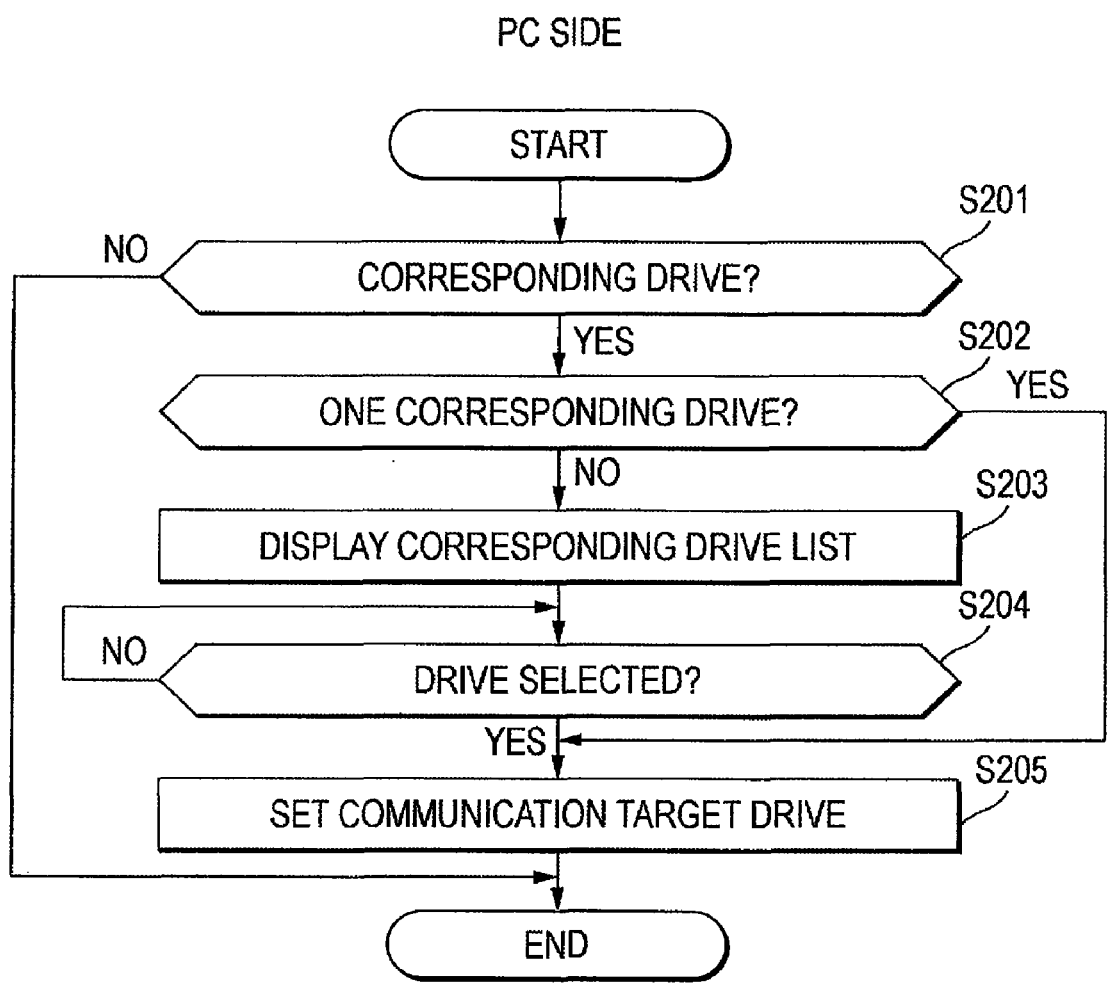
FIG. 6 is a flowchart illustrating the drive setting process.
Figure 7:
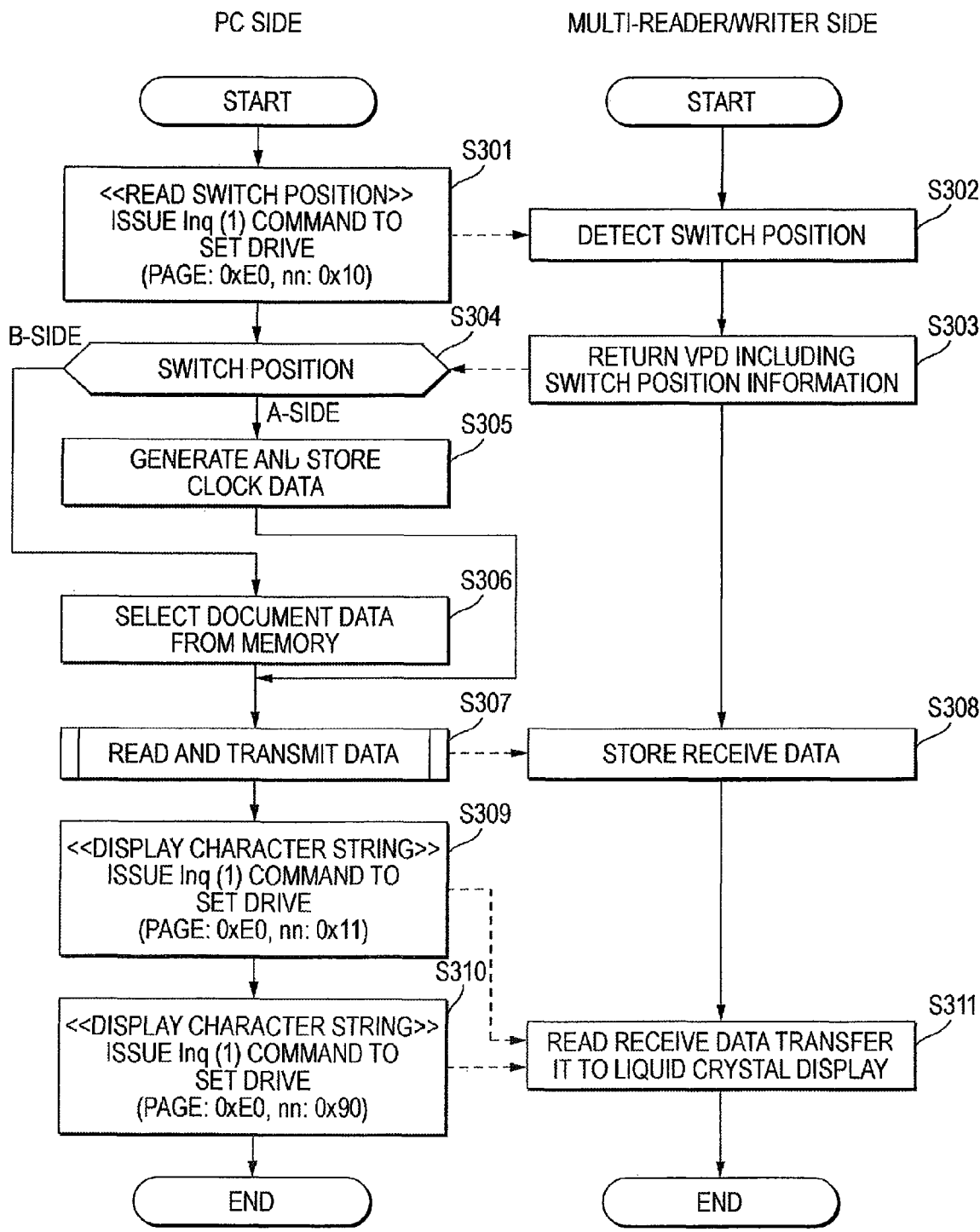
FIG. 7 is a flowchart illustrating the transmission/display process.
Figure 8:
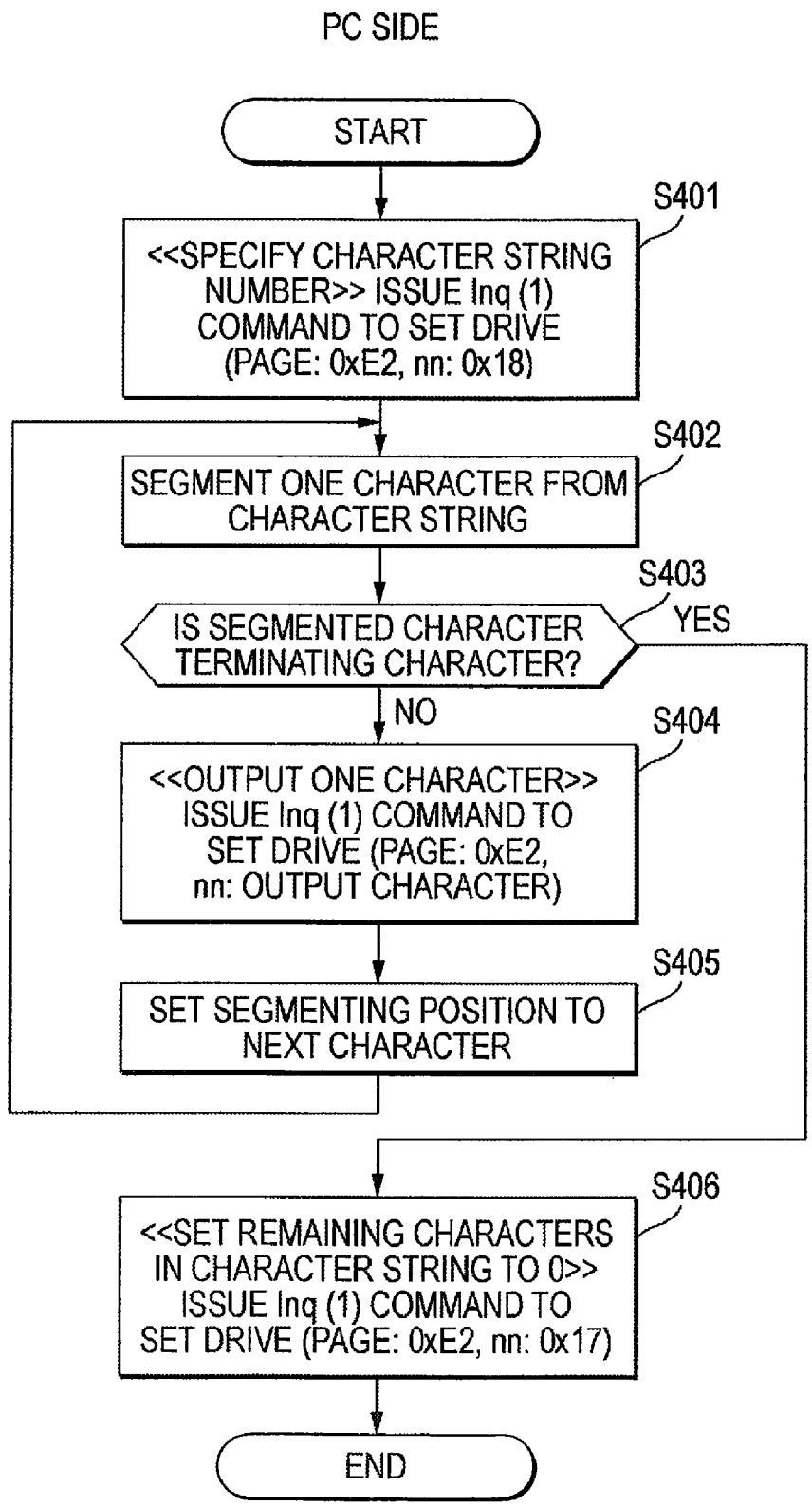
FIG. 8 is a flowchart illustrating the transmission processing.

Using the flowchart of FIG. 5, the drive allocation process (S1) performed by the CPU 41 of the PC 3 will be described. The process starts with step S101.

In step S101, a drive to be referenced (hereinafter referred to as the referenced drive) is initially set to Drive A (S101). The referenced drive means a dive that may be allocated by the PC 3. When a plurality of drives may be allocated, a drive is selected in ascending order in the drive allocation step. The referenced drive is managed by the OS kernel of the OS 2000 of the PC 3. In this embodiment, the candidate drives for allocation are A to Z (total 26 drives).

When a referenced drive is set, the Inquiry command (hereinafter referred to as the Inq(0) command) to request the device to which the drive is allocated to return Standard-Inquiry data (hereinafter abbreviated as the S/I data) is issued by the CPU 21 to the referenced drive (S102). In practice, the Inq(0) command is issued to the OS kernel by the CPU 41 and the OS kernel assumes that the Inq(0) command is issued to the referenced drive. Inquiry data with the EVPD ("Enable Vital Product Data") area set to "0" (hereinafter referred to as Inq(0) data) is generated by the OS kernel and transmitted to an unknown device associated with the referenced drive. The SCSI standard specifies that S/I data be returned in case the EVPD area is set to "0". A specific example of Inq(0) data generated in this embodiment is shown in Table 3. In the data columns of Table 3, data is shown in hexadecimals. Unless otherwise specified, any data column shows data in hexadecimal notation.

TABLE 3

Inq(0) data (Inquiry data, EVPD = 0)

| Byte | Data | Remarks |
|---|---|---|
| 0 | 0x12 | Inquiry code number |
| 1 | 0x00 | SCSI-LUN, EVPD = 0 |
| 2 | 0x00 | Fixed to 0 when EVPD = 0 |
| 3 | 0x00 | Reserved (fixed to 0) |
| 4 | nn | Allocation length (Allocation length area) |
| 5 | 0x00 | Control byte (fixed to 0) |

In case a device associated with the referenced drive is present and the device is capable of processing an SCSI command (SCSI command-compatible device), S/I data is returned from the device. In case such a device is absent, or in case one is present but incapable of processing an SCSI command (SCSI command-incompatible device), S/I data is not returned from the device. In step 103, error determination is made by the CPU 41 based on the presence/absence of response of S/I data (S102). In case S/I data is not returned, an error is assumed (Yes in S102). In this case, execution proceeds to step S107. In case S/I data is returned, an error is not assumed (No in S102). In other words, it is determined that a device is present associated with the referenced drive. In this case, execution proceeds to step S105.

In case an error is not assumed in step S103, it is determined whether the device associated with the referenced drive can be a communication target or a communicable device based on the returned S/I data. In this embodiment, the step is performed to determine whether the device associated with the referenced drive is a multi-reader/writer 2. In this embodiment, S/I data shown in Table 4 is returned by the multi-reader/writer 2 to the PC 3. Determination in the step is made by checking the data in Byte 0 or 1, the vendor ID of the area of Byte 8 to Byte 15 and product ID of the area of Byte 16 to Byte 31 of the returned S/I data against the ID information pre-registered in the PC 3. In case the device in question is determined as a communicable device in step S104 (Yes in S104), execution proceeds to step S105. In case the device in question is determined as a non-communicable device in step S104 (No in S104), execution proceeds to step $107. The data "0x00" in the area of Byte 0 indicates a direct access device while the data "0x80" in the area of Byte 1 indicates a rewritable storage medium. Content described in each byte area is defined in the SCSI standard. For details, refer to the SCSI standard.

physical I/F of the multi-reader/writer 2 (information indicating USB in this embodiment) in the upper 4 bits of the area of Byte 54 and store the LUN number in the lower 4 bits. Thus, the CPU 41 has only to reference the data in the area of Byte 54 to acquire LUN information. This performs determination in step S105. For example, in case "0x00" is stored in the area of Byte 54, information is acquired indicating that the physical I/F is a USB connector and the LUN is 0. In case "0x23" is stored, information is acquired indicating that the physical I/F is an SCSI connector and the LUN is 3.

In step S105, when the LUN is determined as "0" (Yes in step S105), execution proceeds to step S107. In case the multi-reader/writer 2 is connected to a PC 3 where the OS 2000 is installed, the PC 3 recognizes that LUN=0 even in case the information LUN=1 is stored in the area of Byte 54 on the multi-reader/writer 2. Processing in step S105 necessarily ends with Yes. In this case, the determination in step S105 is meaningless so that it may be omitted.

In step S106, the current referenced drive is added to a corresponding drive list. The corresponding drive list is a list of referenced drives to which drives are finally allocated. To be more specific, the corresponding drive list is expanded in a predetermined storage area of the RAM 43 and the corresponding referenced drive is written into the storage area. Execution then proceeds to step S107.

In step s107, Whether the referenced drive is Drive Z is determined by the CPU 41. For example, whether the current referenced drive is Drive Z may be determined by counting the drive referencing order on a counter memory and supervising the count value with the CPU 41. Such determination is made to determine whether the referenced drive now specified is the final one. When it is determined that the referenced drive is Drive Z, no further drives to be referenced exist, so

TABLE 4

Standard Inquiry data

| Byte | Data | Remarks |
|---|---|---|
| 0 | 0x00 | Direct access device |
| 1 | 0x80 | Rewritable storage medium |
| 2 | 0x02 | SCSI-2 |
| 3 | 0x02 | SCSI-2 |
| 4 | 0x5B | Up to Byte 95 |
| 5 | 0x00 | System reserved (fixed to 0) |
| 6 | 0x00 | System reserved (fixed to 0) |
| 7 | 0x00 | Flag |
| 8-15 | | Vendor ID (Example: ASCII code indicating a manufacturer) |
| 16-31 | | Product ID (Example: ASCII code indicating a model name) |
| 32-35 | | Product version number (Example: ASCII code indicating a version) |
| 36-55 | | Vendor specific |
| 54 | | Upper 4 bits: Physical I/F information (0 = No information; 1 = USB; 2 = SCSI; 3 = IDE). Lower 4 bits: LUN information (For USB, USB-LUN; For SCSI or IDE, SCSI-LUN). |
| 55 | | Upper 4 bits: USB multi function device (0 = No information; 1 = USB multi function device; 2 = USB single function device). Lower 4 bits: Indicates a multi-I/F number for a USB multi function device. |
| 56-95 | 0x00 | System reserved (fixed to 0) |

When execution proceeds to step S105, whether the LUN of the referenced drive is "0" is determined by the CPU 41 based on the returned S/I data. This determination is made based on the data in the area of Byte 54 in the vendors-specific area in the S/I data. In this embodiment, as described earlier, S/I data shown in Table 4 is returned from the multi-reader/writer 2 to the PC 3. As described in the Remark column for the area of Byte 54 in Table 4, in the multi-reader/writer 2, programming is made to store information indicating the that execution proceeds to step S109. Otherwise, the referenced drive is set to the next-order drive (S108). The procedure from step S102 is repeated until step S107 ends with Yes.

When execution proceeds to step S109, drives are allocated based on the corresponding drive list. This terminates a series of drive allocation processes (S1). In this embodiment, only the multi-reader/writer 2 is connected as an external storage device so that the multi-reader/writer 2 is allocated to Drive A, with no devices allocated to the other drives.

Next, the drive setting process (S2) performed by the CPU 41 of the PC 3 will be described. The process starts with step S201.

In step S201, whether a drive allocated by the drive allocation process (S1) (hereinafter referred to as the "corresponding drive") is present is determined (S201). That is, whether a predetermined device is allocated to any one of the drives that accepts allocation on the PC 3 is determined. In this embodiment, Drive A is present where the multi-reader/writer 2 is allocated so that it is determined that a corresponding drive is present. Then, whether only one corresponding drive is present is determined (S202). In case it is determined that the corresponding drive is absent in step S202 (No in S201), no communication targets are present thus terminating the process. In this case, clock data or message data stored in the RAM 43 is not transmitted.

In case it is determined that only one corresponding drive is present in step S202 (Yes in S202), the corresponding drive is set as a communication target (s205). That is, a device associated with the corresponding drive is set as a communication target. In this embodiment, Drive A is set as a communication target. In other words, the multi-reader/writer 2 is set as a communication target device.

In case it is determined that more than one corresponding drive is present (No in S202), an icon indicating the corresponding drive is displayed in a dialog form (S203). When the user picks up any icon to select a desired corresponding drive, the selected corresponding drive is set as a communication target, In case no icon is selected while corresponding drives are given priorities, a corresponding drive with the highest priority is automatically set as a communication target. This terminates a series of drive setting processes (S2).

Next, the transmission/display process (s3) performed by the CPU 41 of the PC 3 will be described. The transmission/display process (S3) is performed between the multi-reader/writer 2 set as a communication target in the drive setting process (S2) and the PC 3. The process starts with step S301.

From the PC, The Inquiry command used to request the multi-reader/writer 2 to return the VPD (Vital Product Data) on the multi-reader/writer 2 (hereinafter referred to as the Inq(1) command) is issued to Drive A (step S301). In practice, the Inq(1) command is issued to the OS kernel and the OS kernel assumes that the Inq(0) command is issued to Drive A. Inquiry data with the EVPD area set to "1" (hereinafter referred to as Inq(1) data) is generated by the OS kernel and transmitted to the multi-reader/writer 2 associated with Drive A via the USB cable 25. The Inq(1) data generated is shown in Table 5. as shown in Table 5, a page code "0xE0" is described in the area of Byte 2 of the Inq(1) data. The SCSI standard specifies that VPD be returned in case the EVPD area is set to "1".

TABLE 5

| Inq(1) data (Inquiry data, EVPD = 1) | | |
|---|---|---|
| Byte | Data | Remarks |
| 0 | 0x12 | Inquiry code number |
| 1 | 0x01 | SCSI-LUN, EVPD = 1 |
| 2 | 0xE0 | Page code when EVPD = 1 |
| 3 | 0x00 | Reserved (fixed to 0) |
| 4 | 0x10 | Allocation length |
| 5 | 0x00 | Control byte (fixed to 0) |

As shown in Table 5, "0x10" ("00010000" in binary notation) is stored in the area of Byte 4, or allocation area, of Inq(1) data. Basically, the allocation length area stores a data length required of the connected device. In this embodiment, the maximum value of the allocation length of the multi-reader/writer 2 is preset to a fixed length of 15 bytes. The numeral "15" may be represented by the lower 4 bits. According to the SCSI standard, even when a numeric value exceeding the maximum value set by the multi-reader/writer 2 is specified as an allocation length, The allocation length of the multi-reader/writer 2 is set to the maximum value or 15 bytes. Even in case "0x10" is described in the allocation length area, or even in case "0x11" or a greater value is described, the allocation length is set to 15 bytes. This means that, in case any one of the upper 4 bits is "1", data in the allocation length area may be used as arbitrary data without limitation. By setting any one bit of the upper 4 bits to "1", it is possible to reserve the bits other than the bit set to "1" in the allocation length area. In this invention, data communications are performed between a PC 3 and a multi-reader/writer 2 by adding arbitrary communication data to the reserved free area.

The allocation length is not necessarily set to a fixed length of 15 bytes. The maximum value of the allocation length may be set in accordance with the page code of Inq(1) data. For example, the maximum value of the allocation length is set to a fixed length of 15 bytes in case the page code is "0xE0". The maximum value of the allocation length is set to a fixed length of 9 bytes in case the page code is "0xE2". This setting process is made as the content of the page code is read by the CPU 27 of the multi-reader/writer 2 that has received Inq(1) data and a corresponding fixed length is selected from a fixed length corresponding list previously stored in the ROM 28. The allocation length set to 15 bytes or 9 bytes may be arbitrarily set.

Tables 6 and 7 show classified communication data added to a free area reserved in the allocation length area. As shown in the data description column of each table, each data item has a definition of what the data item means. For details, refer to the description in the data description column. Table 6 shows communication data transmitted in case in case the page code is "0xE0". Table 7 Table 6 shows communication data transmitted in case in case the page code is "0xE2".

TABLE 6

| Page code: 0xE0 | |
|---|---|
| Allocation area data | Data description |
| 0x00-0x0F (00000000)-(00001111) | Allocation length |
| 0x10 (00010000) | Acquires switch content. |
| 0x11 (00010001) | Transfers to the liquid crystal display the data stored in the character string storage area of a character string number of next transmit data (0x80-0xFF). |
| 0x1F (00011111) | Cancels processing while waiting for next transmit data. |

TABLE 7

| Page code: 0xE2 | |
|---|---|
| Allocation area data | Data description |
| 0x00-0x09 (00000000)-(00001001) | Allocation length |
| 0x0a-0x0F (00001010)-(00001111) | Text data |
| 0x20-0x0FF (00100000)-(11111111) | Text data |

TABLE 7-continued

Page code: 0xE2

| Allocation area data | Data description |
|---|---|
| 0x10 (00010000) | Stores 0x00 into the character string storage area of the device |
| 0x11 (00010001) | Stores into the character string storage area of the device a value obtained by subtracting 0x20 from next transmit data (0x20-0x3F). |
| 0x12 (00010010) | Pad all character string storage areas with 0x00. |
| 0x13 (00010011) | Pad the character string storage area of a character string number of next transmit data (0x90-0xFF) with 0x00. |
| 0x17 (00010111) | Pad all areas following the current character in the current character string storage area with 0x00. |
| 0x18 (00011000) | at the head of the character string storage area of a character string number 0x90. |
| 0x1F (00011111) | Cancels processing while waiting for next transmit data. |

As shown in Tables 6 and 7, the left column shows data described in the allocation length area while the right column shows the meaning of the data. When the data in the left column is transmitted from the PC 3 to the multi-reader/writer 2, the multi-reader/writer 2 uses the CPU 27 to extract the data in the allocation length area from the received Inq(1) data, analyzes the content of extracted data, and performs processing in accordance with the analysis result. Data in Tables 6 are 7 is previously stored in the HDD 44 or ROM 42 of the PC 3 and Rom 28 of the multi-reader/writer 2 in a table list format.

Inq(1) data generated when the Inq(1) command was issued in step S301 has "0x10" described in the allocation length area as shown in Table 5. Thus, the Inq(1) command is a command issued by the PC 3 to request the multi-reader/writer 2 to read the switch position.

On the other hand, the multi-reader/writer 2 receives the transmitted Inq(1) data. Then the data "0x10" in the allocation length area in the Inq(1) data is extracted by the CPU 27 and the position of the selector switch 22 is detected in accordance with the data (3302).

When the switch position is detected, the detection result is returned by the CPU 27 to the PC 3 (S303). The return processing is made by writing the detection result into the VPD (refer to Table 8) generated after receipt of Inq(1) data and returned to the PC 3. To be more specific, as shown in Table 8, detection result of the switch position is written into the area of Byte 7. In this embodiment, in case the selector switch 22 is in Position A, "0x00" is written. In case the selector switch 22 is in Position B, "0x01" is written. Table 8 shows the VPD assumed in case the switch is in Position B.

TABLE 8

VPD (Inq(1) data reception)

| Byte | Data | Remarks |
|---|---|---|
| 0 | 0x00 | Direct access device |
| 1 | 0xE0 | Page code |
| 2 | 0x00 | Reserved (fixed to 0) |
| 3 | 0x0B | Byte 15 (0-15) present |
| 4 | nn | Version information of device |
| 5 | 0x00 | Fixed to 0 |
| 6 | nn | (Unused) |
| 7 | 0x01 | Switch position |
| 8-14 | nn | (Unused) |

Next, the PC 3 receives VPD returned from the multi-header/writer 2 and references the area of Byte 7 of the VPD to determine in which contact, A or B, the switch is positioned. In case it is determined that the selector switch 22 is in Position A (A in S304), the current clock data is generated and is stored into the RAM 43 (s305). In case it is determined that the selector switch 22 is in Position B (B in S304), a message data item previously selected by the user is selected out of the plural message data items stored in the RAM 43 (S306).

After that, a transmission process is performed where The clock data or selected message data item stored in the RAM 43 is read and the data is transmitted to the multi-reader/writer 2 (S307). This transmission process is performed in accordance with the procedure on and after step S401 shown in the flowchart of FIG. 8. That is, the Inq(1) command is issued (step S401). Inq(1) data generated when the Inq(1) command is issued is transmitted to the multi-reader/writer 2. VPD is returned from the XXX 2 on issuance of the Inq(1) command, without return data added to the VPD. Thus, the VPD return processing will not be described.

To be more specific, in step S401, Inq(1) data is generated where "0xE2" is described as a page code in the area of Byte 2 and "0x18" is described in the allocation length area. The Inq(1) command issued in step S401 is a request command to set a pointer at the head of the character string storage area (storage area in the RAM 29) corresponding to the character string number shown by "0x90" according to Table 7. This request command is issued to the multi-reader/writer 2. The pointer means an indicator to indicate the position where a character segmented in step S402 is stored as described later.

In step S402, characters are segmented in order from the top of character string data indicating a time or a message stored in the RAM 43 of the PC 3. Whether a character segmented in step S402 is a terminating character is determined by the CPU 41 (5403). This processing is determined based on whether the data indicating a segmented character is "0x00". Because "0x00" does not indicate a character, in case it is determined that the data is "0x00", the segmented character is determined to be a terminating character. When the segmented character is determined to be a terminating character, execution proceeds to step S406. In case it is determined that the segmented character is not a terminating character, execution proceeds to step S404.

When execution proceeds to step S404, the Inq(1) command is issued and Inq(1) data is generated where "0xE2" is described as a page code and "output character" is described in the allocation length area. The generated Inq(1) data is transmitted to the multi-reader/writer 2. The output character means data to indicate a character segmented in step S402, for example data represented in an ASCII code.

After the Inq(1) data is transmitted, the segmenting position of character data is set to next character (S405). Then the procedure from step S402 is repeated. When execution proceeds to step S406, the Inq(1) command is issued and Inq(1) data is generated where "0xE2" is described as a page code in the area of Byte 2 and "0x17" is described in the allocation length area. This is a request command to pad all bit areas with "0x00" starting with the area where the last character (end character) is stored. In other words, this is a request command to append "0x00" to the end of data transmitted to the multi-reader/writer 2 and stored into the RAM 29 to align the stored data to bit data of a predetermined length (for example 128 bytes). In step S406, the transmission processing (S307) is complete.

When data is transmitted by way of the transmission processing (S307), the transmitted data is received by the multi-reader/writer 2 and the received data is stored into the RAM 29 (S308). In practice, each time a character segmented in step S406 (refer to FIG. 8) is transmitted, its character data is sequentially stored into the RAM 29.

After the transmission processing (S307), in step S309, the Inq(1) command is issued by the PC 3 again. The Inq(1) data generated on that occasion is transmitted to the multi-reader/writer 2 (S309). The Inq(1) data generated on that occasion is shown in Table 9. As shown in Table 9, "0xE0" is described in the area of Byte 2 and "0x11" is described in the allocation length area. From Table 6, it is understood that the issued Inq(1) command is a request command to transfer data stored in the character string storage area (storage area in the RAM 29) of a character string number corresponding to the number shown by the next data to transmit, to the liquid crystal display 21 of the multi-reader/writer 2.

TABLE 9

Inq(1) data (Inquiry data, EVPD = 1)

| Byte | Data | Remarks |
| --- | --- | --- |
| 0 | 0x12 | Inquiry code number |
| 1 | 0x01 | SCSI-LUN, EVPD = 1 |
| 2 | 0xE0 | Page code when EVPD = 1 |
| 3 | 0x00 | Reserved (fixed to 0) |
| 4 | 0x11 | Allocation length |
| 5 | 0x00 | Control byte (fixed to 0) |

After that, the Inq(1) command is issued again. The Inq(1) data is transmitted to the multi-reader/writer 2 where "0xE0" is described as a page code in the area of Byte 2 and character data is described in the allocation length area (S310). When the Inq(1) data is read by the multi-reader/writer 2, receive data (character data) stored in the character string storage area corresponding to a character string number transmitted in step S310 is read by the CPU 27 and the receive data is transferred to the liquid crystal display 21. This causes the data from the PC 3 to be displayed on the liquid crystal display 21.

Figure 9:
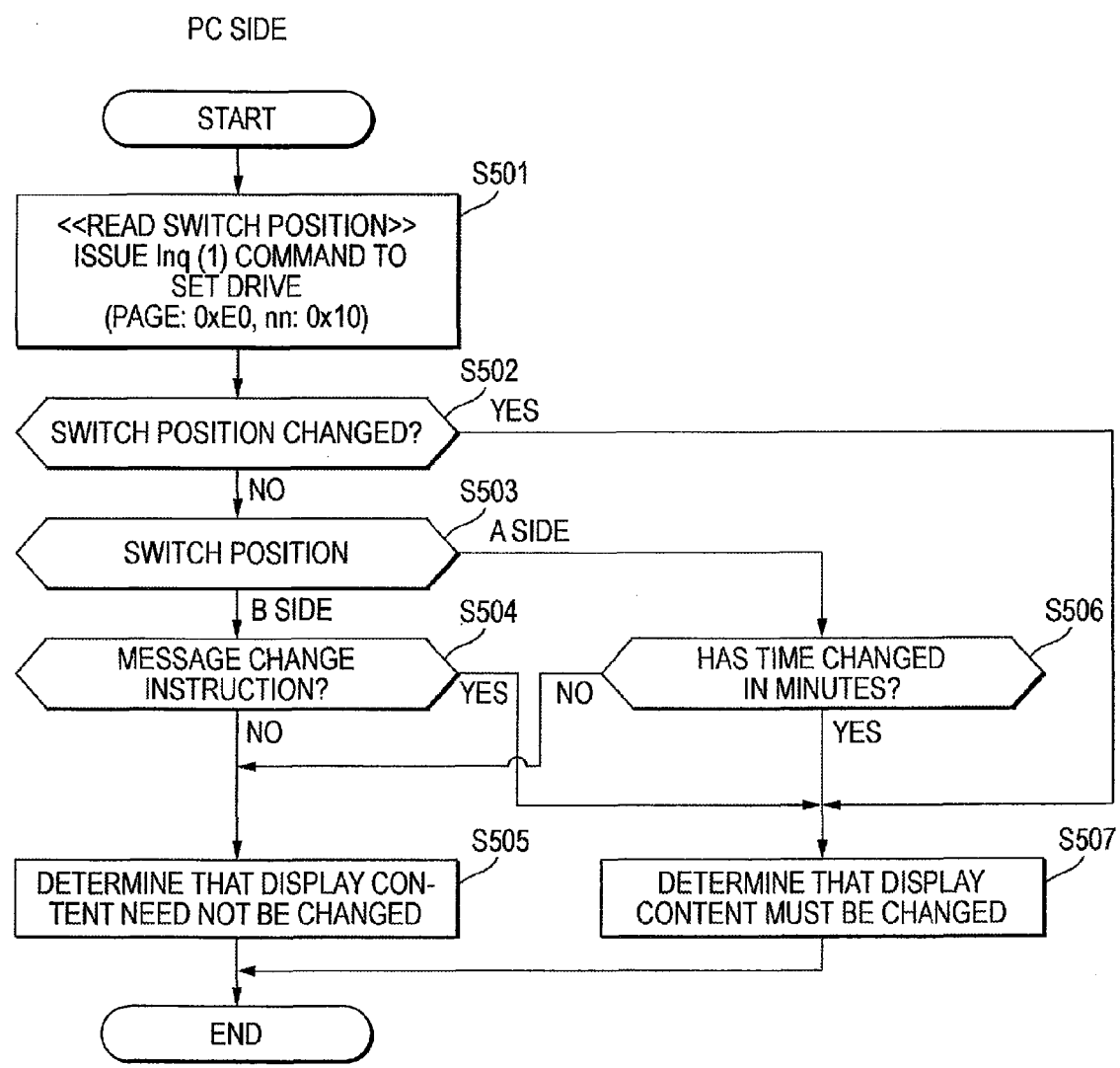
FIG. 9 is a flowchart illustrating the determination process.

Next, the determination process (S6) to determine whether the display content must be changed will be described using the flowchart of FIG. 9. The determination process is performed by the CPU 41 of the PC 3. This process starts with step S501.

In step S501, same as step S301, the Inq(1) command is issued. The Inq(1) data generated on that occasion is transmitted to the multi-reader/writer 2 to detect the position of the selector switch 22. In step S502, whether the switch position has changed is determined. This processing is made by previously storing the switch position detected in step S301 into the RAM 29 and comparing the stored switch position information with the switch position detected in step S501. When it is determined that the switch contact has changed by the user's operation to toggle the switch, it is determined that the display content must be changed (S507). Otherwise, the switch position information stored in the RAM 29 is read in step S502 and the current switch position is confirmed.

In case the current switch position is in contact A or on the clock side, execution proceeds to step S506. Here, whether the time has changed in minutes since clock data was generated in step S305 is determined based on the clock function of the PC 3. In case it is determined that the time has changed, it is determined that the display content must be changed (S507). Otherwise, it is determined that the display content need not be changed (S505).

In case the current switch position is in contact B or on the message side, execution proceeds to step S504. Here, whether the time has changed in minutes since clock data was generated in step S305 is determined based on the clock function of the PC 3. In case it is determined that the time has changed, it is determined that the display content must be changed (S507). Otherwise, it is determined that the display content need not be changed (S505).

Figure 10:
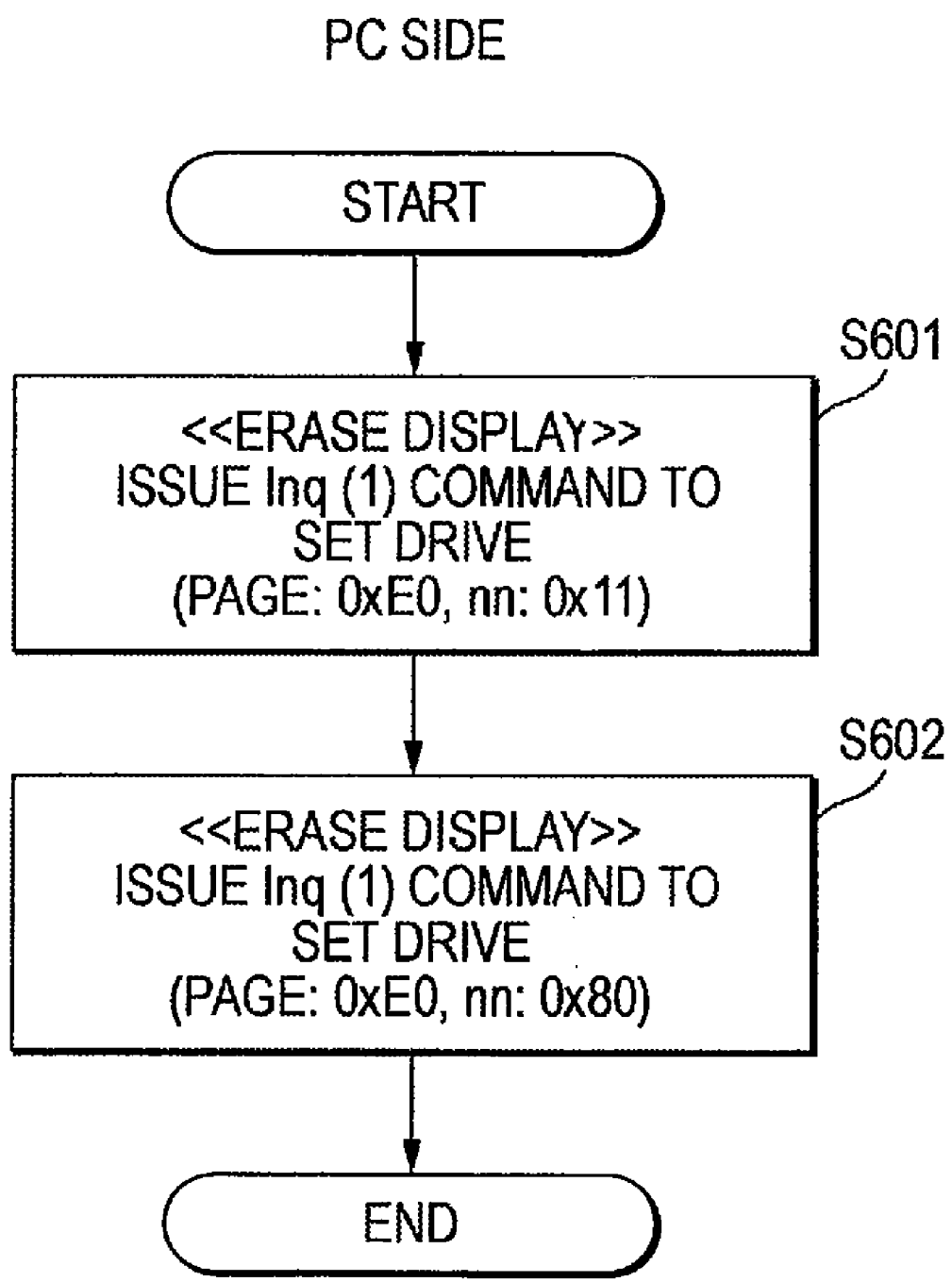
FIG. 10 is a flowchart illustrating the display erasure process.

Next, the display erasure process (S7) will be described using the flowchart of FIG. 10. The process starts with step S601.

In case it is determined that an end instruction is input in step S5 (refer to FIG. 4), the Inq(1) command is issued in step S601. The Inq(1) data generated on that occasion is transmitted to the multi-reader/writer 2 (S601). The Inq(1) data generated on that occasion is has "0xE0" described in the area of Byte 2 and "0x11" described in the allocation length area. From Table 6, it is understood that the issued Inq(1) command is a request command to transfer data stored in the character string storage area of a character string number indicated by the next data to transmit, to the liquid crystal display 21 of the multi-reader/writer 2. In step S602, the Inq(1) command is issued. The Inq(1) data is generated and transmitted where "0xE0" is described in the area of Byte 2 and "0x80" is described in the allocation length area. The character string storage area of a character string number indicated by "0x80" is previously reserved as vacant data. This causes the CPU 27 of the multi-reader/writer 2 to transfer the vacant data in the character string storage area of the character string number indicated by "0x80" to the liquid crystal display and the display content is erased.

Data communications are performed in accordance with the above procedure in this embodiment. For example, even in case a memory card is replaced with another, it is possible to transfer clock data and message data from the PC 3 to the multi-reader/writer 2 while the multi-reader/writer 2 is retaining its replacement information. It is also possible to transfer the switch position information on the selector switch from the multi-reader/writer 2 to the PC 3. Even in case the multi-reader/writer 2 is in the Not Ready state where an SCSI command from the PC 3 is rejected because the driver software for the multi-reader/writer is not installed, data communications between the PC 3 and the multi-reader/writer 2 are assured. While clock data, message data and switch position information are described as data to be communicated in this embodiment, data to be communicated in this invention is not limited thereto.

Figure 11:
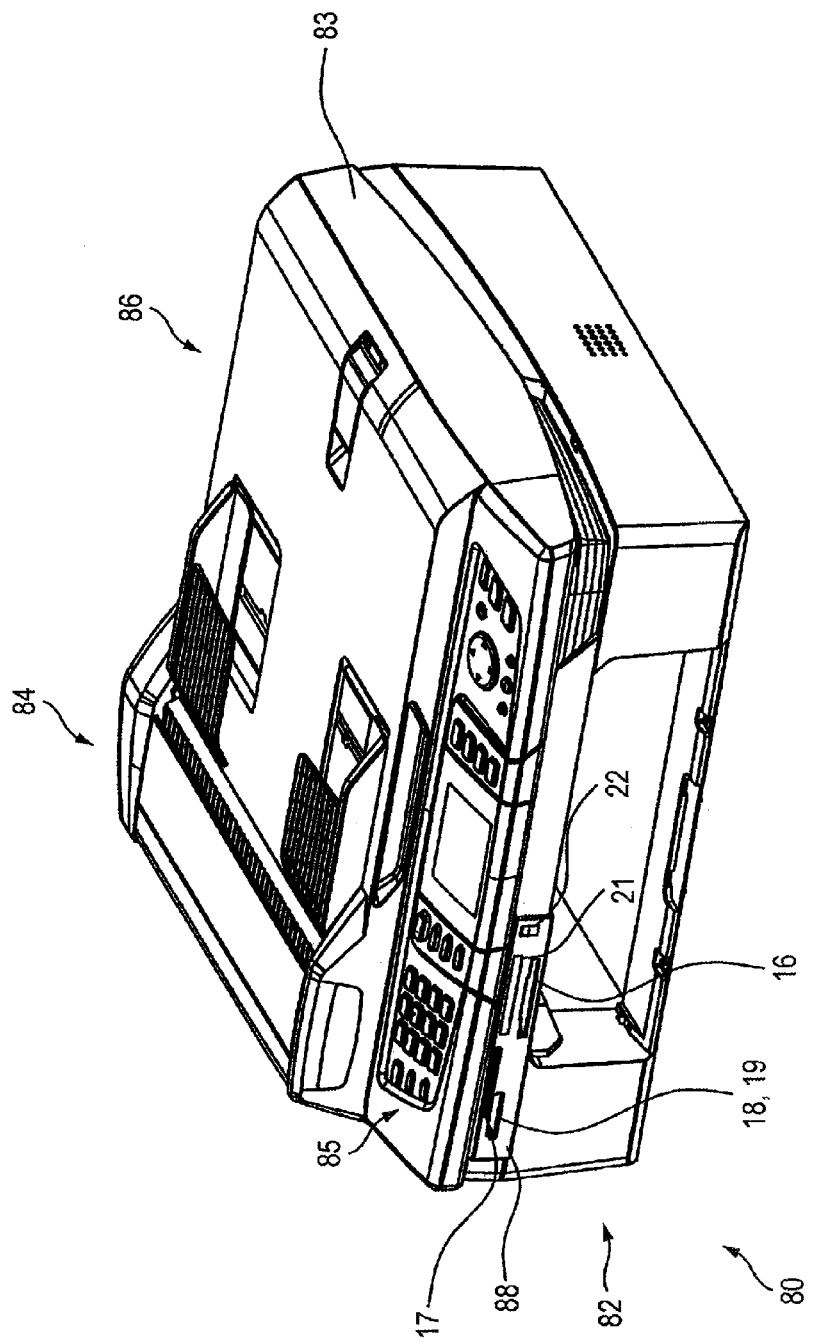
FIG. 11 is a schematic external view of a multi function device.

While the multi-reader/writer 2 as a standalone device is described as an example of peripheral device in the first embodiment, a communication system using a multi function device (MFD) shown in FIG. 11 as a peripheral device will be described in the second embodiment. FIG. 11 is a schematic external view of a multi function device 80.

As shown in FIG. 11, the multi function device 80 integrally includes a printer 82 arranged in a lower part, a scanner 83 arranged above the printer 82, a manuscript cover 86 equipped with an ADF 86, an operation panel 85 arranged on the front side of the top surface of the device, and a multi-reader/writer 88 arranged so as to expose a slot on the front surface of the device, and has a printer function, a scanner function, a copy function, and a facsimile function.

The multi function device 80 is connected to a PC 3 (refer to FIG. 3) mainly described in the first embodiment and records images or documents on recording paper on the printer 82 based on print data including image data and document data transmitted from the PC 3. The printer 82 may record images or documents on recording paper based on the print data read by the multi-reader/writer 88 from a memory card. Further, the printer 82 works as a reader/writer device to perform data communications with a memory card inserted into the multi-reader/writer 88. The printer 82 also transmits image data read by the scanner 83 to the PC 3 or makes thereon a copy of an image read by the scanner 83.

Figure 12:
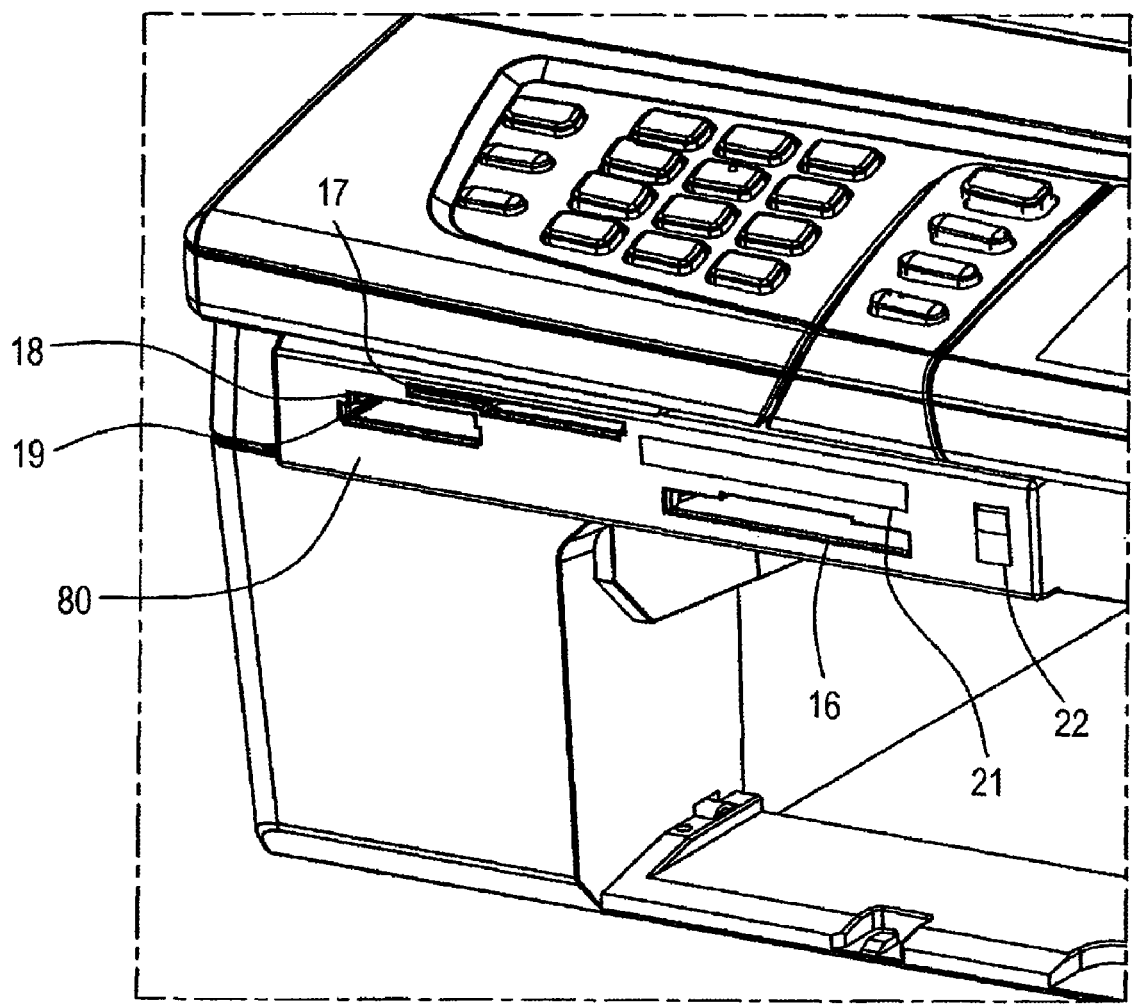
FIG. 12 is a partial enlarged view of a multi-reader/writer.
Figure 13:
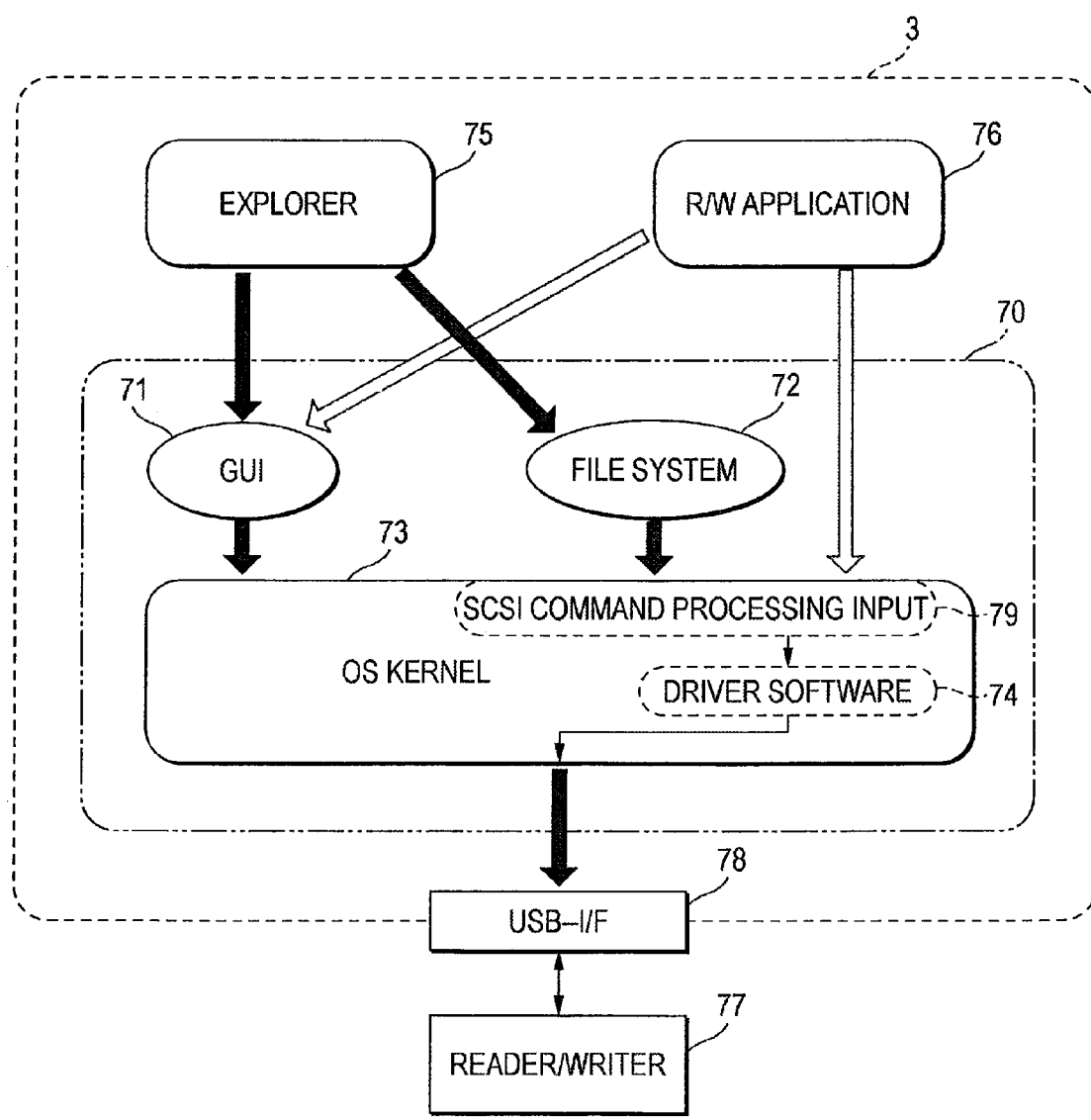
FIG. 13 is a conceptual drawing illustrating an OS running on the PC and an application running on the OS.

As shown in FIG. 12, the multi-reader/writer 88 of the multi function device 80 includes a first slot 16, a second slot 17, a third slot 18 and a fourth slot 19. Configuration and function of each slot and a memory card inserted into each slot are same as those on the multi-reader/writer 2 in the first embodiment except that the third slot 18 and the fourth slot 19 are integrated. The multi-reader/writer 88 includes a liquid crystal display 21 and a selector switch 22 mounted on its front surface where the slots are arranged. Configuration and function of the liquid crystal display 21 and the selector switch 22 are the same as those in the first embodiment. Thus, a same component as in the first embodiment is given the same sign as the first embodiment and the detailed description is omitted.

The multi function device 80 thus configured and the PC 3 are interconnected to provide a similar communication system to that in the first embodiment. Even in case the multi function device 80 is in the Not Ready state where it rejects an SCSI command from the PC 3, data communications between the PC 3 and the multi function device 80 are assured.

The first and second embodiments are only examples of this invention and may be changed as required without departing from the spirit and scope of the invention.

According to the aspects, when the Inquiry data is received, the peripheral device returns VPD (Vital Product Data) to the information processing device depending on the content of the Inquiry data. By writing into the free area of VPD from a peripheral device to an information processing device before returning the VPD, data transfer from the peripheral device to the information processing device is assured.

According to the aspects, the current SCSI standard specifies that the EVPD area be composed of a single bit string. According to the SCSI standard, the EVPD area is set to "0" before acquiring the configuration information of a peripheral device. The SCSI standard describes that, in case "1" is set to the EVPD area, an optional feature works to transfer VPD information from a peripheral device to an information processing device. However, it is empirically known that the optional feature rarely used in reality. The invention adds communication data to the free area in case "1" is set to the EVPD area. This discriminates between a case where the configuration information of a peripheral device is acquired using Inquiry data and a case where data communications are made.

According to the aspects, the current SCSI standard specifies that the allocation length area is composed of an 8-bit string or a 16-bit string.

This area is used to describe the data length of a memory area for storing data into a recording medium inserted into a peripheral device. The area has a larger bit width than other areas and may be modified, so that it is preferable as an area to add communication data.

According to the aspects, for example, in case the allocation length area is an 8-bit string, the maximum numeric value information described therein is $(255)_{10}$ in decimals and $(0xFF)_{10}$ in hexadecimals. In case the allocation length allocated to the recording medium is a smaller numeric value than $(255)_{10}$, a numeric value larger than the numeric value is not used as information indicating an allocation length. This unused area is preferably used as a free area.

According to the aspects, for example, inn case the allocation length area is an 8-bit string and the allocation length for the peripheral device is preset to $(127)_{10}$ in decimals, the value $(127)_{10}$ may be expressed in seven bits so that seven bits of the allocation length area are used to represent $(127)_{10}$. The remaining one bit is left unused. In this case, by efficiently using the remaining one bit, it is possible to reserve a free area of maximum 7 bits in the allocation length area.

In general, data communications between a file system and a recording medium, that is, communications between a file system and a peripheral device are on the way, communications with the peripheral device by another application are inhibited unless the communication are terminated. This is true to the reverse case. This is because the system is designed in principle so that a command issued by another application will not be accepted by a peripheral device in order to avoid an error in the ongoing communications. The exception in this case is the Inquiry command which is accepted by a peripheral device as specified in the SCSI standard. By transmitting/receiving Inquiry data with communication data added to/from a peripheral device, it is possible for another application to perform data communications with the peripheral device even in case there are ongoing communications between a file system and the peripheral device.

What is claimed is:

1. A communication system that performs data communications based on a Small Computer System Interface (SCSI) command defined in the SCSI standard, the communication system comprising:
    a peripheral device that performs at least one of writing and reading to/from a recording medium inserted into a slot; and
    an information processing device connected to the peripheral device, including:
        an operating system (OS) kernel;
        an adding unit that adds communication data, including an instruction which causes the peripheral device to execute a function, to a free area of inquiry data generated by issuing an inquiry command to the OS kernel, wherein the free area is an area that is preliminarily reserved in an allocation length area of the inquiry data, and wherein the communication data is added in the preliminarily reserved area; and
        a transmitting unit that transmits the inquiry data to the peripheral device including the communication data added by the adding unit, wherein the peripheral device includes:
        a receiving unit that receives the inquiry data transmitted by the transmitting unit; and
        an extracting unit that extracts the communication data added to the received inquiry data.

2. The communication system according to claim 1, wherein the peripheral device includes a returning unit that writes return data corresponding to the communication data into a vital product data (VPD) on the peripheral device generated on receipt of the inquiry data and returning the VPD to the information processing device.

3. The communication system according to claim 1, wherein the adding unit adds the communication data to the free area in case "1" is set to an enable vital product data (EVPD) area of a single bit string of the inquiry data.

4. The communication system according to claim 1, wherein
    the allocation length allocated to the recording medium on the peripheral device is preset below a maximum number of bytes that can be described in the allocation length area.

5. The communication system according to claim 1, wherein
the allocation length allocated to the recording medium is preset to a byte number represented equal to or less than a string of (n−1) bits in case the allocation length area includes an n-bit string.

6. The communication system according to claim 1, wherein if an application performed by the information processing device by occupying data communications that are based on the SCSI command with the peripheral device and a file system that manages data stored in the recording medium inserted in the peripheral device are operable, the adding unit adds the communication data to the previously reserved free area in the Inquiry data generated when the inquiry command was issued by the application while the file system is managing data in the recording medium.

7. The communication system according to claim 1, wherein the peripheral device and the information processing device are interconnected via Universal Serial Bus (USB).

8. The communication system according to claim 1, wherein the peripheral device executes the function corresponding to the instruction that is included in the communication data extracted by the extracting unit, and
wherein the peripheral device transmits a result of the execution of the function to the information processing device.

9. The communication system according to claim 1, wherein the peripheral device comprises a switch, and the function comprises a process of detecting a status of the switch.

10. The communication system according to claim 1, wherein the peripheral device comprises a display unit, and the function comprises a process of displaying a predetermined character on the display unit.

11. An information processing device, comprising: an operating system (OS) kernel;
an adding unit that adds communication data, including an instruction which causes a peripheral device to execute a function, to a free area of inquiry data generated by issuing an inquiry command to the OS kernel, wherein the free area is an area that is preliminarily reserved in an allocation length area of the inquiry data, and wherein the communication data is added in the preliminarily reserved area; and
a transmitting unit that transmits the inquiry data to the peripheral device including the communication data added by the adding unit, wherein
the information processing device is connectable to the peripheral device that performs at least one of writing and reading to/from a recording medium inserted into a slot, and the information processing device performs data communications with the peripheral device based on an Small Computer System Interface (SCSI) command defined in the SCSI standard.

12. A peripheral device comprising:
a receiving unit that receives inquiry data, which includes communication data added to a free area of the inquiry data and is transmitted by an information processing device, the communication data including an instruction which causes the peripheral device to execute a function, wherein the free area is an area that is preliminarily reserved in an allocation length area of the inquiry data, and wherein the communication data is added in the preliminarily reserved area; and
an extracting unit that extracts the communication data added to the received inquiry data, wherein the peripheral device is connectable to the information processing device, performs at least one of writing and reading to/from a recording medium inserted into a slot and performs data communications with the information processing device based on an Small Computer System Interface (SCSI) command defined in the SCSI standard.

13. The peripheral device according to claim 12, further comprising: a returning unit that returns the vital product data (VPD) to the information processing device after writing return data corresponding to the communication data into the VPD on the peripheral device generated on receipt of the inquiry data.

14. The peripheral device according to claim 12, further comprising a Universal Serial Bus (USB) connection unit that connects to the information processing device via USB.

15. A communication method that performs data communications based on an Small Computer System Interface (SCSI) command defined in the SCSI standard between a peripheral device that performs at least one of writing and reading to/from a recording medium inserted into a slot and an information processing device connected to the peripheral device, the communication method comprising:
adding communication data, including an instruction which causes the peripheral device to execute a function, to a free area of inquiry data generated by issuing an inquiry command to an operating system (OS) kernel of the information processing device, wherein the free area is an area that is preliminarily reserved in an allocation length area of the inquiry data, and wherein the communication data is added in the preliminarily reserved area;
transmitting the inquiry data to the peripheral device including the communication data;
receiving the transmitted inquiry data; and
extracting the communication data added to the received inquiry data.

* * * * *